US010571755B2

(12) United States Patent
Nakamura et al.

(10) Patent No.: US 10,571,755 B2
(45) Date of Patent: Feb. 25, 2020

(54) LIQUID CRYSTAL DISPLAY DEVICE

(71) Applicant: Japan Display Inc., Minato-ku (JP)

(72) Inventors: Masato Nakamura, Tokyo (JP); Daichi Hosokawa, Tokyo (JP); Yuki Kuramoto, Tokyo (JP); Hideyuki Takahashi, Tokyo (JP)

(73) Assignee: Japan Display Inc., Minato-ku (JP)

(*) Notice: Subject to any disclaimer, the term of this patent is extended or adjusted under 35 U.S.C. 154(b) by 157 days.

(21) Appl. No.: 15/813,868

(22) Filed: Nov. 15, 2017

(65) Prior Publication Data
US 2018/0149932 A1 May 31, 2018

(30) Foreign Application Priority Data
Nov. 30, 2016 (JP) ................. 2016-233482

(51) Int. Cl.
G02F 1/1343 (2006.01)
G02F 1/1335 (2006.01)
G02F 1/1362 (2006.01)
G02F 1/1333 (2006.01)
G02F 1/1337 (2006.01)

(52) U.S. Cl.
CPC .... *G02F 1/134336* (2013.01); *G02F 1/13439* (2013.01); *G02F 1/133512* (2013.01); *G02F 1/134309* (2013.01); *G02F 1/136286* (2013.01); *G02F 1/1362* (2013.01); *G02F 1/133707* (2013.01); *G02F 2001/133388* (2013.01); *G02F 2001/134345* (2013.01); *G02F 2201/52* (2013.01); *G02F 2201/56* (2013.01)

(58) Field of Classification Search
CPC .................................................. G02F 1/13439
See application file for complete search history.

(56) References Cited

U.S. PATENT DOCUMENTS

| 8,378,928 | B2* | 2/2013 | Ogasawara | ....... G02F 1/136286 345/55 |
| 8,451,414 | B2* | 5/2013 | Nonaka | ............. G02F 1/133514 349/146 |
| 10,162,234 | B2* | 12/2018 | Li | ......................... G02F 1/1345 |
| 10,209,413 | B2* | 2/2019 | Wang | ..................... G02B 5/201 |
| 10,209,574 | B2* | 2/2019 | Lee | ....................... G02F 1/1339 |
| 2008/0048934 | A1* | 2/2008 | Yamamoto | .......... G02F 1/13454 345/55 |

(Continued)

FOREIGN PATENT DOCUMENTS

JP 2010-286825 12/2010
WO WO 2009/057342 A1 5/2009

*Primary Examiner* — James A Dudek
(74) *Attorney, Agent, or Firm* — Oblon, McClelland, Maier & Neustadt, L.L.P.

(57) ABSTRACT

According to one embodiment, a liquid crystal display device includes a first area, second area, liquid crystal layer, and a plurality of pixels. Each subpixel includes an opening area including a first opening area and a second opening area. The pixels include a first pixel positioned in the first area and a second pixel positioned over a boundary of the first area and the second area. The opening area of the second pixel is smaller than the opening area of the first pixel when opening areas of subpixels of same color are compared. An each imaginary line showing the boundary of the first opening area and the second opening area is a same straight line.

15 Claims, 25 Drawing Sheets

(56) References Cited

U.S. PATENT DOCUMENTS

| | | | |
|---|---|---|---|
| 2010/0156950 A1* | 6/2010 | Pak | G02B 5/201 |
| | | | 345/690 |
| 2010/0214195 A1* | 8/2010 | Ogasawara | G02F 1/136286 |
| | | | 345/55 |
| 2010/0289994 A1* | 11/2010 | Nonaka | G02F 1/133514 |
| | | | 349/108 |
| 2013/0300965 A1 | 11/2013 | Nonaka | |
| 2016/0320646 A1* | 11/2016 | Lee | G02F 1/1339 |

* cited by examiner

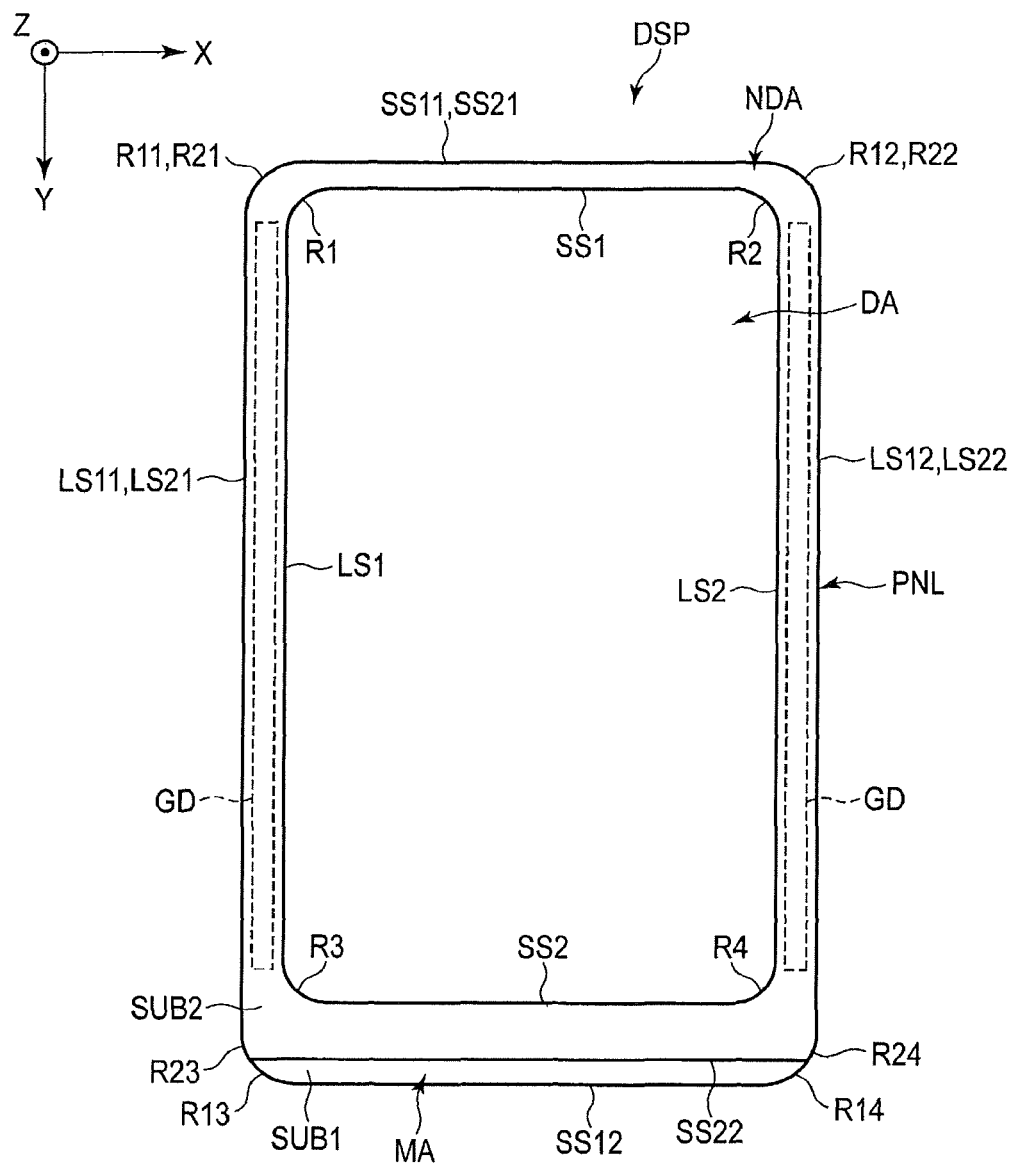
F I G. 1

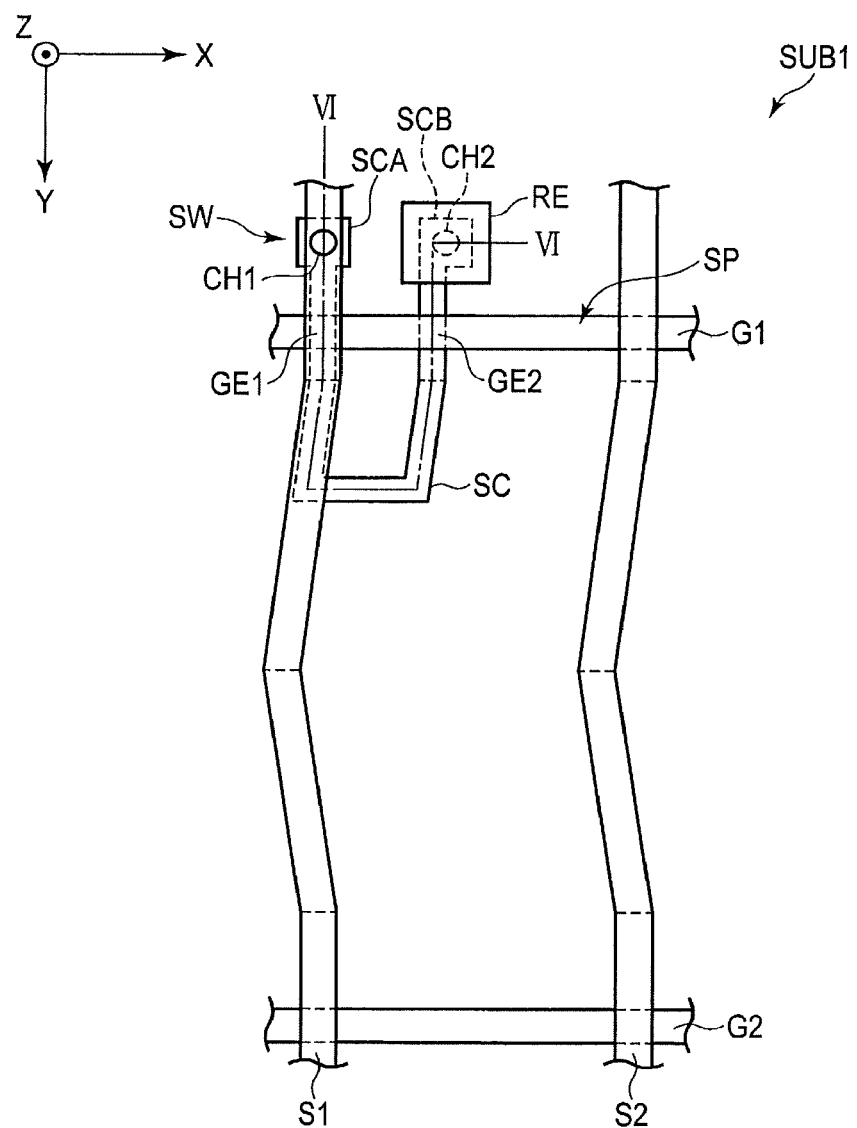
F I G. 4

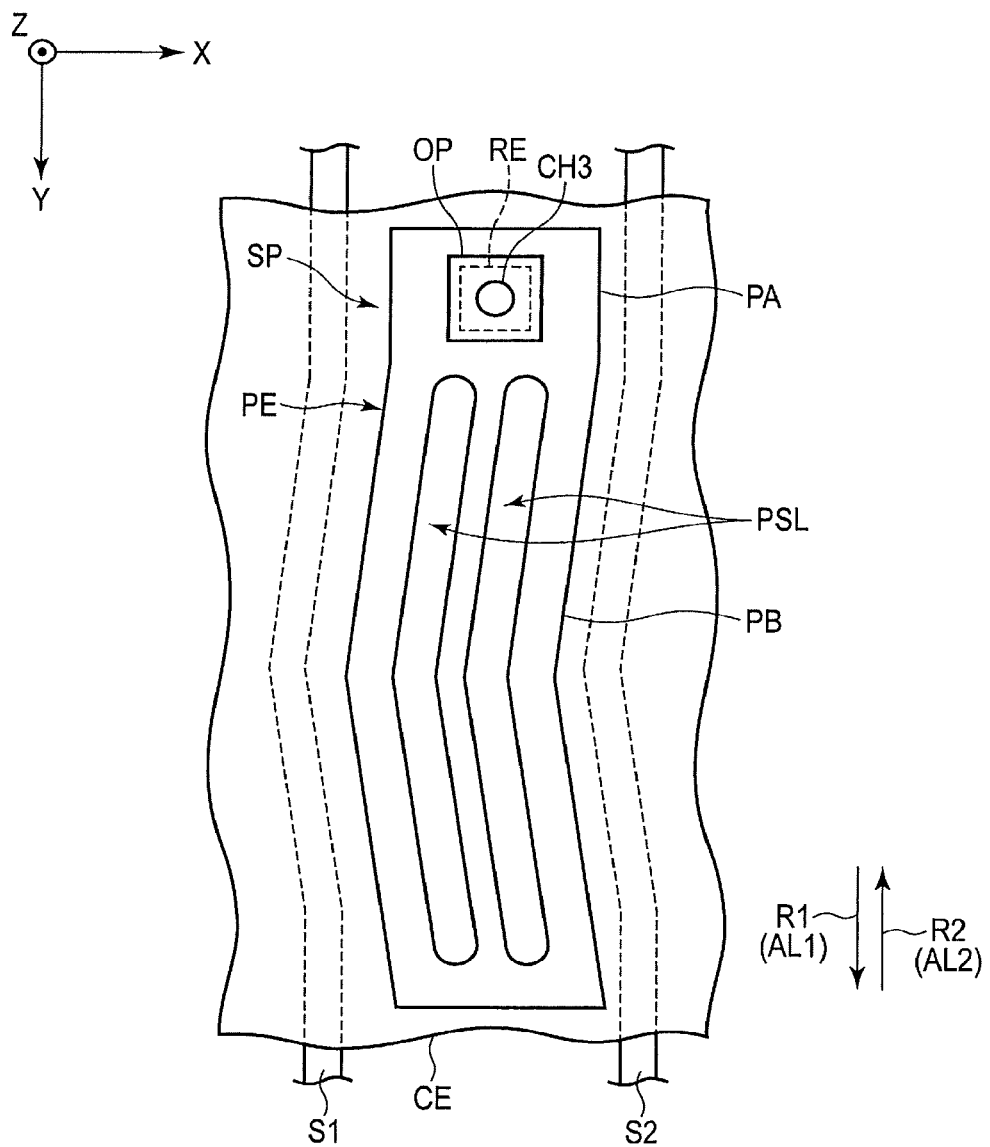
F I G. 5

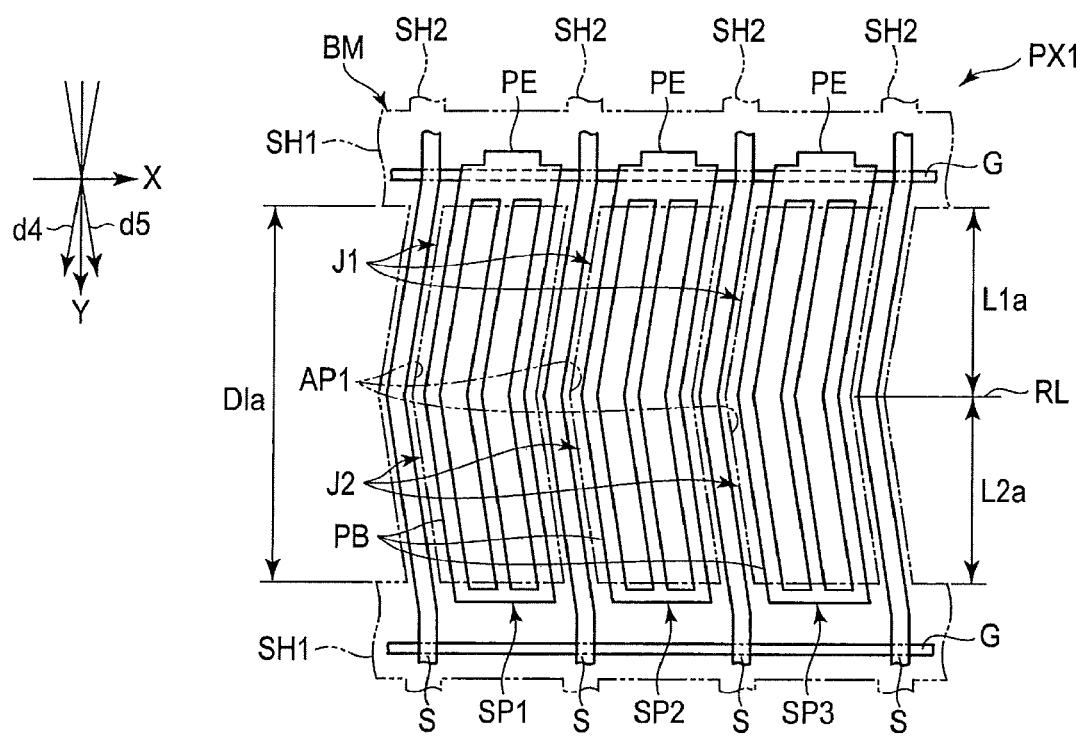
F I G. 9

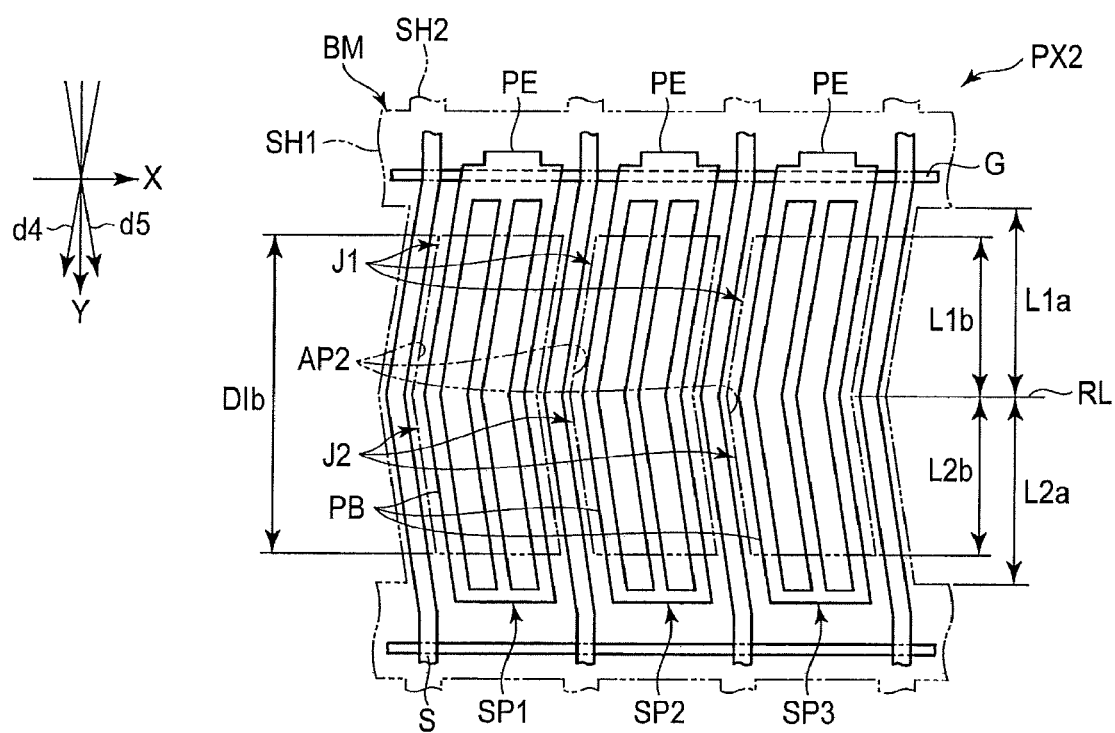
F I G. 10

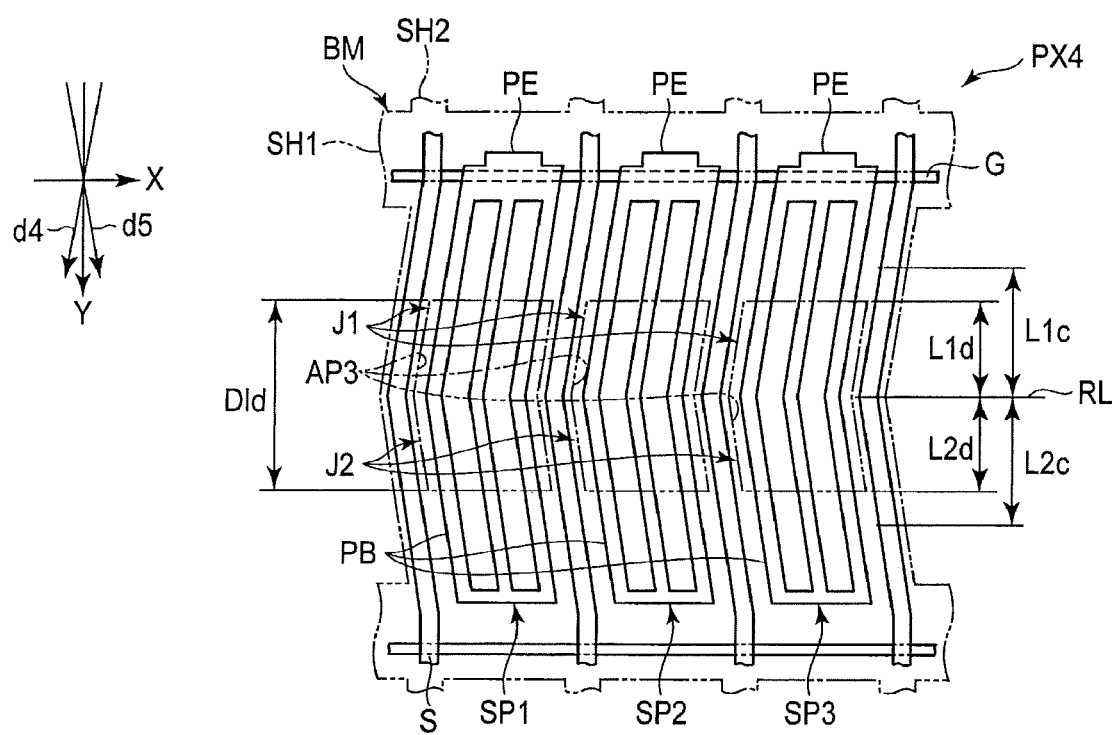
F I G. 12

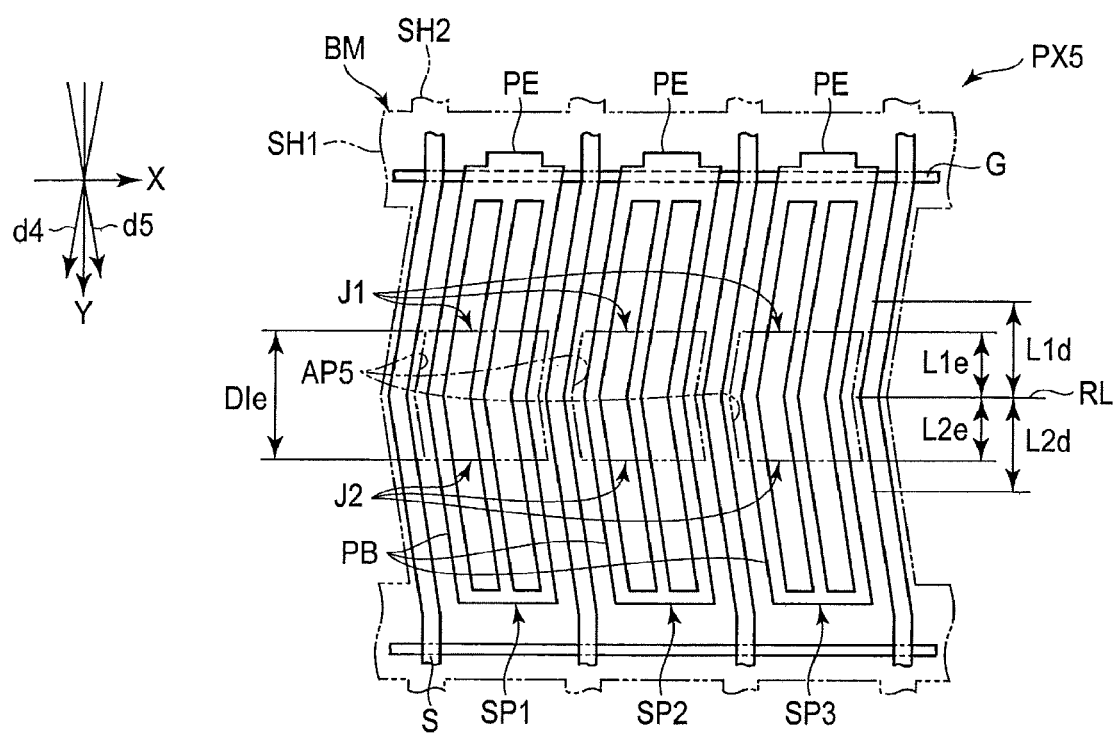
F I G. 13

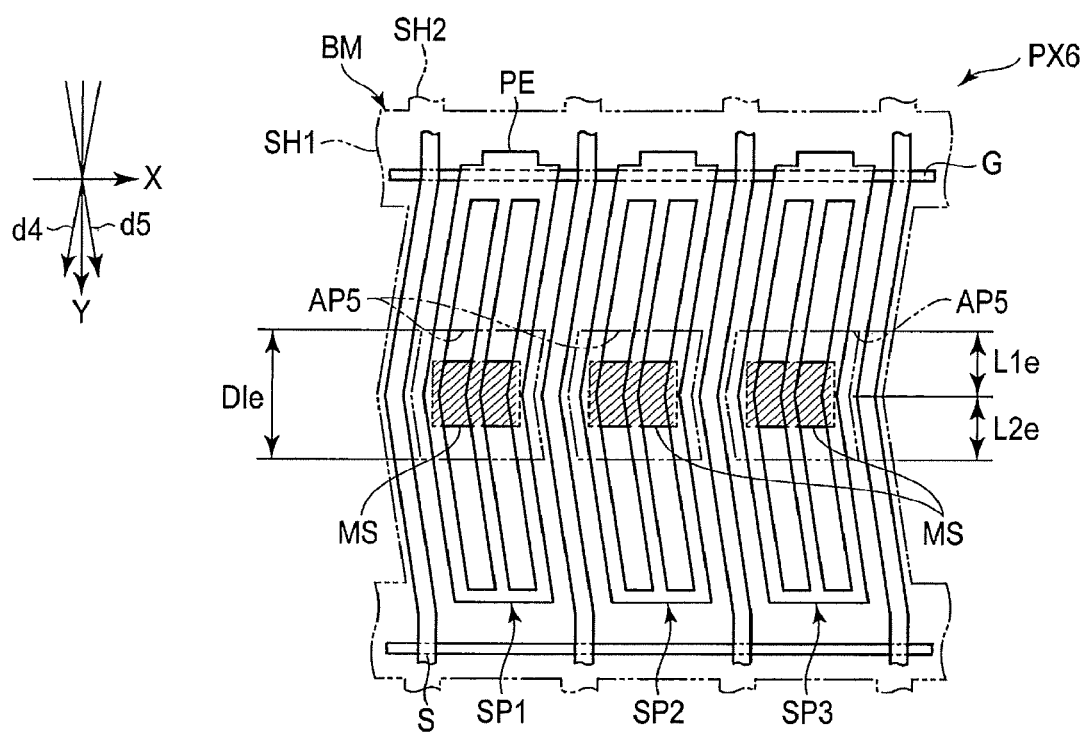
F I G. 14

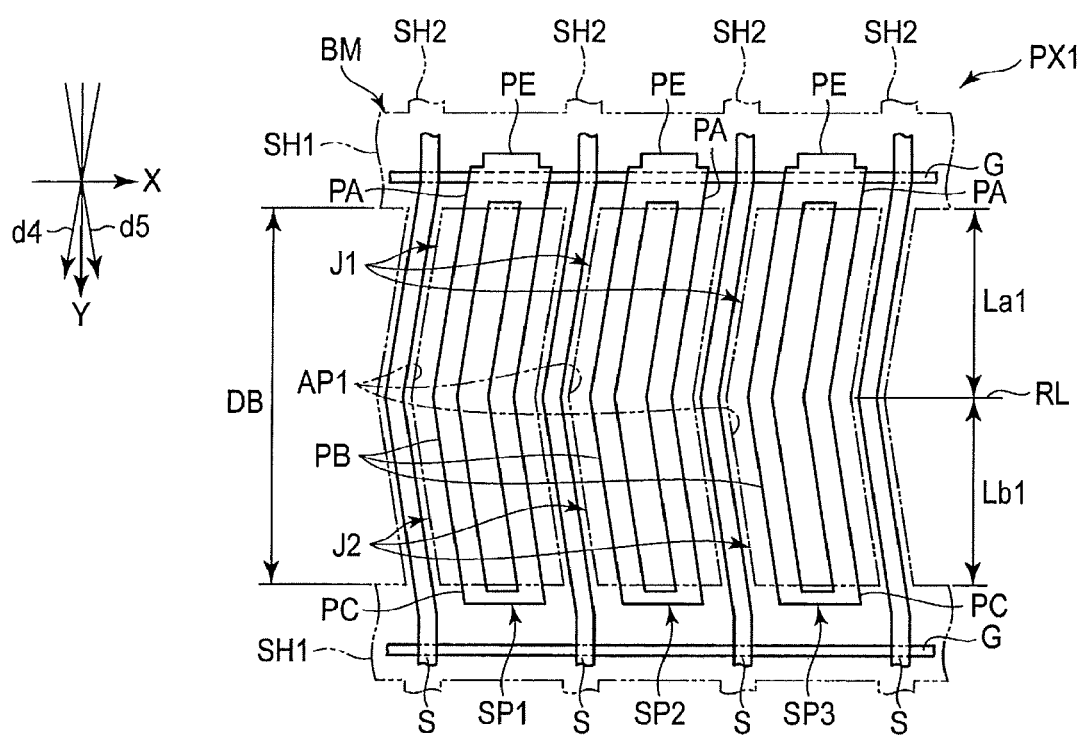
F I G. 15

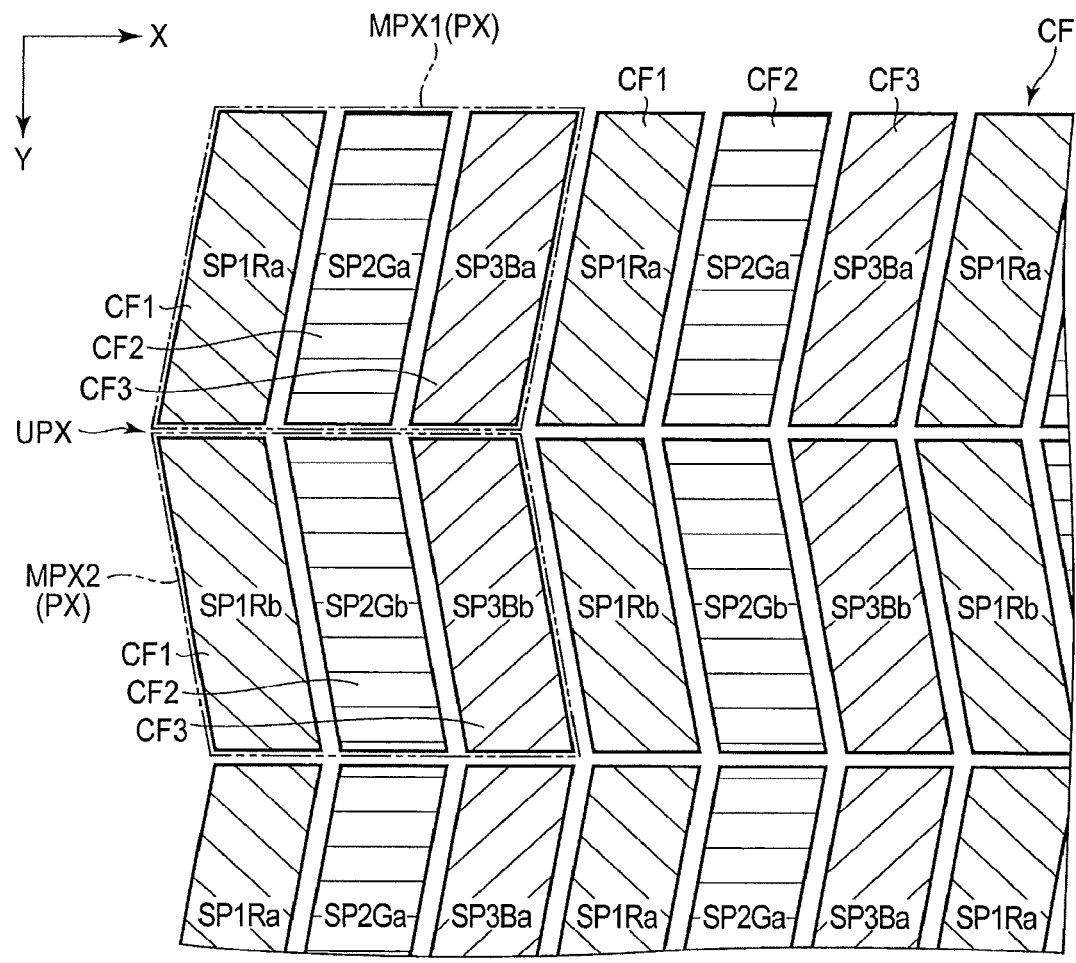
F I G. 18

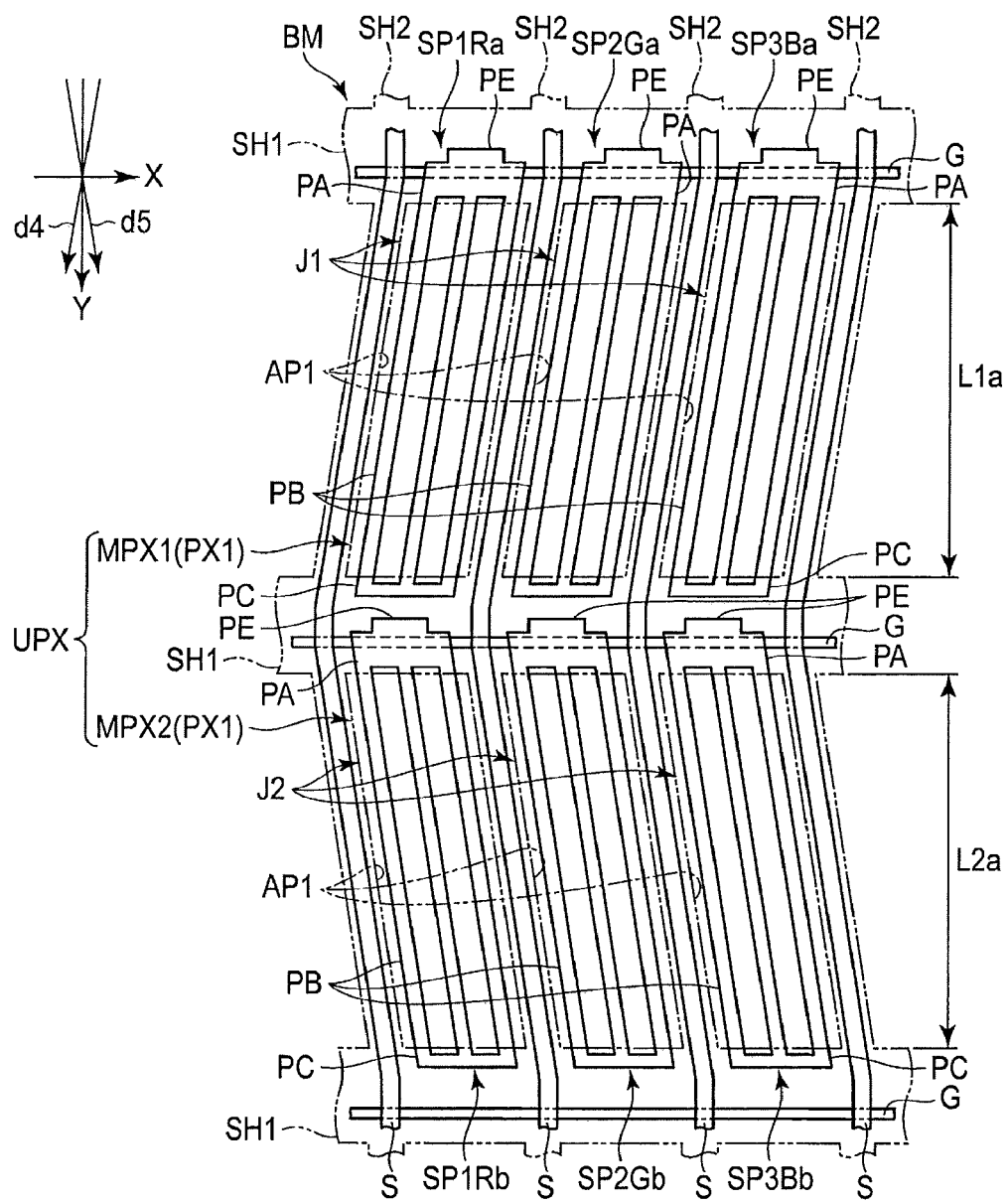
F I G. 19

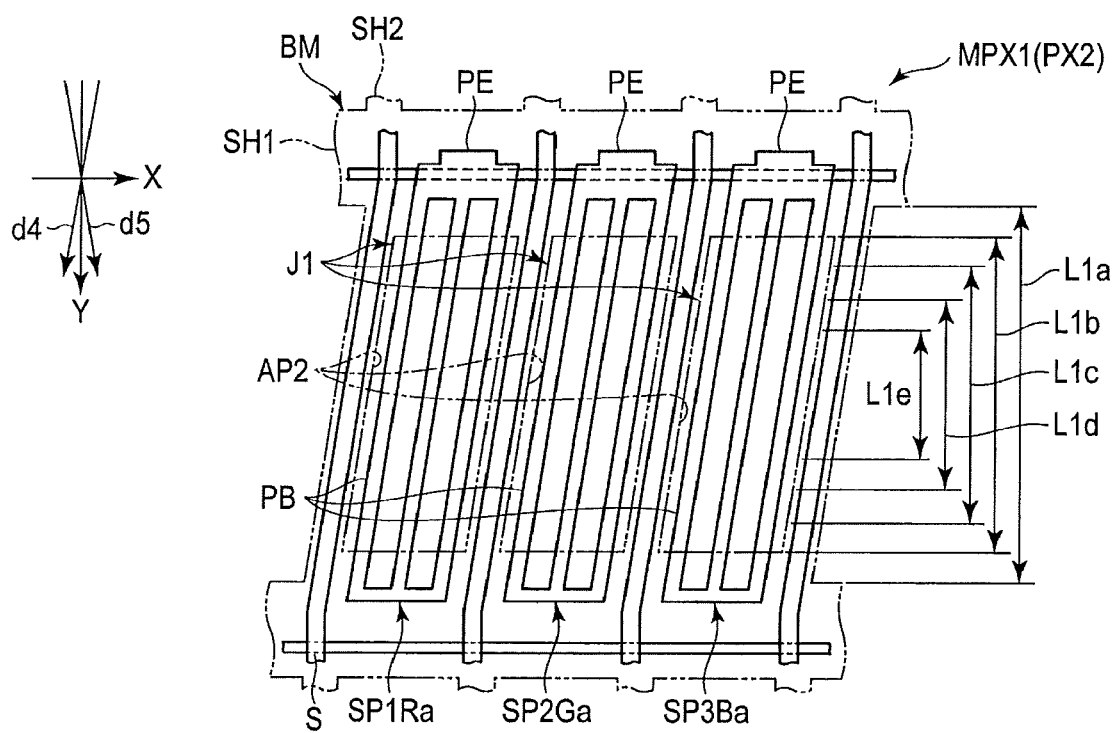
F I G. 20

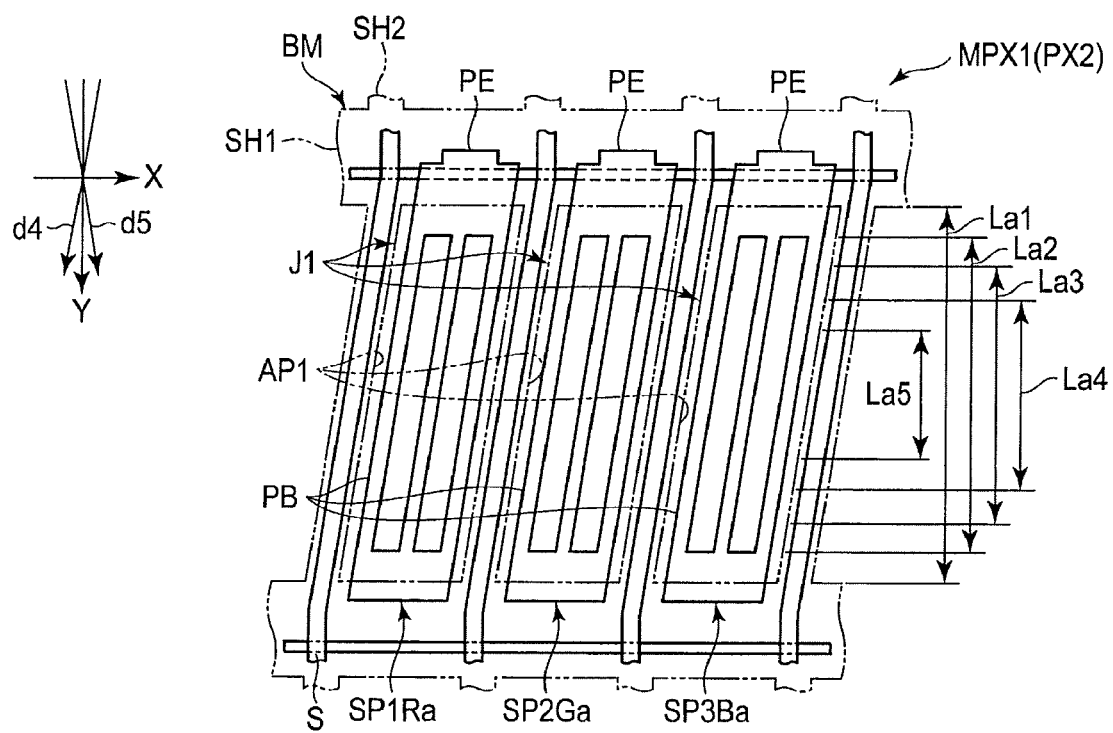
F I G. 22

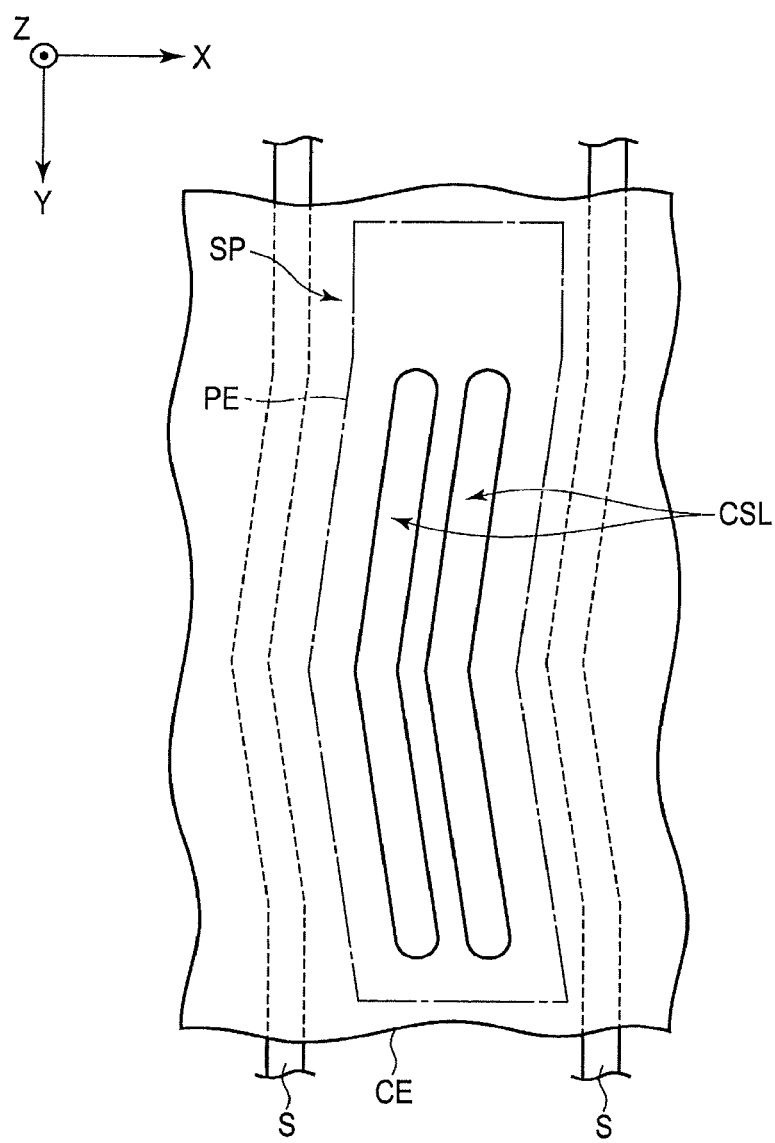
F I G. 25

LIQUID CRYSTAL DISPLAY DEVICE

CROSS-REFERENCE TO RELATED APPLICATIONS

This application is based upon and claims the benefit of priority from Japanese Patent Application No. 2016-233482, filed Nov. 30, 2016, the entire contents of which are incorporated herein by reference.

FIELD

Embodiments described herein relate generally to a liquid crystal display device.

BACKGROUND

Liquid crystal display devices which are typical as a flat surface display device are used as display devices in various fields such as personal computers and televisions because of their light, thin, and low power characteristics. In recent years, liquid crystal display devices are used as display devices of mobile terminals such as mobile phones, car navigation devices, and gaming devices.

Furthermore, the shape of the display area in which an image is displayed is conventionally a rectangle having right-angle corners but it is desired to be applicable to a non-rectangle such as a circle and an ellipse.

BRIEF DESCRIPTION OF THE DRAWINGS

FIG. 1 is a plan view showing an exterior of a display device of a first embodiment.

FIG. 4 is a plan view showing an example of the structure of a subpixel when a first substrate of FIG. 1 is viewed from the side of a second substrate.

FIG. 5 is a plan view showing an example of the structure of a pixel electrode disposed in the subpixel.

FIG. 9 is a plan view showing a first pixel of FIGS. 7 and 8 in which scanning line, signal line, pixel electrodes, and light shielding layer are depicted.

FIG. 10 is a plan view showing a second pixel of FIGS. 7 and 8 in which scanning lines, signal lines, pixel electrodes, and light shielding layer are depicted.

FIG. 12 is a plan view showing a fourth pixel of FIGS. 7 and 8 in which scanning lines, signal lines, pixel electrodes, and light shielding layer are depicted.

FIG. 13 is a plan view showing a fifth pixel of FIGS. 7 and 8 in which scanning lines, signal lines, pixel electrodes, and light shielding layer are depicted.

FIG. 14 is a plan view showing a sixth pixel of the display device of a variation according to the first embodiment in which scanning lines, signal lines, pixel electrodes, and light shielding layer are depicted.

FIG. 15 is a plan view showing a first pixel of a display device of a second embodiment in which scanning lines, signal lines, pixel electrodes, and light shielding layer are depicted.

FIG. 18 shows a pixel arrangement in a display panel of a display device of a third embodiment.

FIG. 19 is a plan view showing a unit pixel of a display panel of the third embodiment in which scanning lines, signal lines, pixel electrodes, and light shielding layer are depicted.

FIG. 20 is a plan view showing a second pixel of the third embodiment in which scanning lines, signal lines, pixel electrodes, and light shielding layer are depicted.

FIG. 22 is a plan view showing a second pixel of a display panel of the display device of a variation according to the third embodiment in which scanning lines, signal lines, pixel electrodes, and light shielding layer are depicted.

FIG. 25 is a plan view showing an example of the structure of a pixel electrode and a common electrode disposed in a pixel.

DETAILED DESCRIPTION

Figure 2:
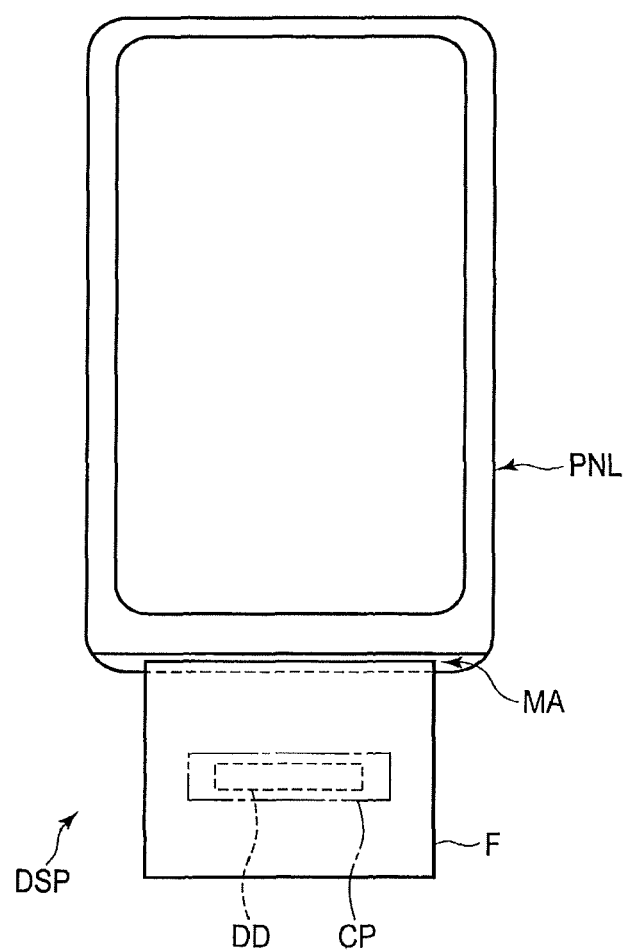
FIG. 2 is a plan view showing an example of the structure of a display panel of FIG. 1 in which a signal source is mounted.

In general, according to one embodiment, there is provided a liquid crystal display device comprising: a first area; a second area outside the first area; a liquid crystal layer positioned at least in the first area; and a plurality of pixels each including a plurality of subpixels having different colors. Each of the subpixels includes an opening area including a first opening area and a second opening area in which a rotation direction of liquid crystal molecules is different from that of liquid crystal molecules in the first opening area. The pixels include a first pixel positioned in the first area and a second pixel positioned over the boundary of the first area and the second area. The opening area of the second pixel is smaller than the opening area of the first pixel when opening areas of subpixels of same color are compared. In each the first pixel and the second pixel, an each imaginary line showing the boundary of the first opening area and the second opening area is a same straight line.

According to another embodiment, there is provided a liquid crystal display device comprising: a first area; a second area outside the first area; a liquid crystal layer positioned at least in the first area; and a plurality of pixels each including a plurality of subpixels having different colors and arranged in a first direction, the pixels arranged in the first direction and a second direction crossing the first direction. In a pair of pixels adjacent to each other in the second direction, the subpixels of one pixel include a first opening area in the center part of the subpixels, respectively, and the subpixels of the other pixel include a second opening area which is different from the first opening area with respect to a rotation direction of liquid crystal molecules in the center part of the subpixels, respectively. The pixels include a first pixel positioned in the first area and a second pixel positioned over the boundary of the first area and the second area. The opening area of the second pixel is smaller than the opening area of the first pixel when opening areas of subpixels of same color are compared.

According to another embodiment, there is provided a liquid crystal display device comprising: a first area; a second area outside the first area; a liquid crystal layer positioned at least in the first area; and a plurality of pixels each including a plurality of subpixels having different colors. Each of the subpixels includes an opening area including a first opening area and a second opening area where the first opening area extends in a fourth direction and the second opening area extends in a fifth direction which is different from the fourth direction. The pixels include a first pixel positioned in the first area and a second pixel positioned over the boundary of the first area and the second area. The opening area of the second pixel is smaller than the opening area of the first pixel when opening areas of subpixels of same color are compared. An imaginary line showing the boundary of the first opening area and the second opening area passes the center part of the subpixel.

Various embodiments will be described hereinafter with reference to the accompany drawings. Note that, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the structural elements having functions, which are identical or similar to the functions of the structural elements described in connection with preceding drawings, are denoted by like reference numerals, and an overlapping detailed description may be omitted.

Initially, a basic concept of embodiments of the present application will be explained.

In color display liquid crystal display devices, pixels include, for example, red, green, and blue subpixels. If the subpixels of the pixels are partly blocked by a light shielding member outside a liquid crystal display panel, the color balance of the pixels is deteriorated, and a color may be displayed in an undesired way. For example, if the red subpixel is partly blocked, an aperture ratio (light transmissivity or light reflectivity) of the red in the pixels decreases, and desired color cannot be displayed.

In order to suppress such undesired color display, a light shielding layer such as a black matrix may be used to block the pixels including partly blocked subpixels; however, in this case, the display area decreases. Furthermore, the edges of the display area is formed of dot patterns, and thus, smoothness of the outline of round parts of the display area becomes insufficient, and visibility becomes poor. Note that the outline of the round parts is non-linear and is curved.

In the embodiments of the present application, a cause of the above problem is clarified and the above problem is solved to present a liquid crystal display device of good display quality. Now, the means and methods to solve the above problem will be explained.

First Embodiment

Now, a display device of a first embodiment will be explained.

FIG. 1 is a plan view showing an exterior of a display device DSP of the first embodiment. Here, a plan view of the display device DSP on an X-Y plane defined by a first direction X and a second direction Y crossing each other is shown. A third direction Z in the figure crosses the first direction X and the second direction Y. In this example, the first direction X, second direction Y, and third direction Z are orthogonal to each other; however, they may cross at angles other than 90 degrees. In the following description, a direction toward the tip of the arrow of the third direction Z will be referred to as above (or up), and a direction opposite to the arrow thereof will be referred to as below (or down). Furthermore, an observation position to look down the display device DSP is given in the tip side of the arrow of the third direction Z, and seeing the X-Y plane from the observation position will be referred to as a plan view.

In the present embodiment, the display device DSP is a liquid crystal display device. The display device DSP includes a display panel PNL. The display panel PNL is a liquid crystal display panel including a first substrate SUB1, second substrate SUB2, liquid crystal layer (liquid crystal layer LC which will be described later). The second substrate SUB2 is opposed to the first substrate SUB1. The display panel PNL includes a display area DA in which an image is displayed and a non-display area NDA outside the display area DA. For example, the non-display area NDA surrounds the display area DA and has a frame-like shape. The non-display area NDA includes a mount area MA in which signal sources such as an IC chip and a flexible printed circuit are mounted.

Referring to the exterior of the display panel PNL, the first substrate SUB1 includes a pair of short sides SS11 and SS12 extending in the first direction X, a pair of long sides LS11 and LS12 extending in the second direction Y, and four round parts R11 to R14. The second substrate SUB2 includes a short side SS21 overlapping the short side SS11, long sides LS21 and LS22 overlapping the long sides LS11 and LS12, respectively, round parts R21 and R22 overlapping the round parts R11 and R12, and short side SS22. The short side SS22 does not overlap the short side SS12. Specifically, the second substrate SUB2 includes a round part R23 connecting the short side SS22 and the long side LS21 and a round part R24 connecting the short side SS22 and long side LS22 where the round part R23 partly overlaps the round part R13 and the round part R24 partly overlaps the round part R14. The mount area MA is disposed between the short side SS12 and the short side SS22 of the first substrate SUB1.

The display area DA includes a pair of short sides SS1 and SS2 extending in the first direction X, a pair of long sides LS1 and LS2 extending in the second direction Y, and four round parts R1 to R4. The short sides SS1 and SS2 and long sides LS1 and LS2 correspond to linear parts connecting the round parts adjacent to each other.

Specifically, as to the round parts R indicative of the boundary of the display area DA and the round parts R of the first substrate SUB1 and the second substrate SUB2, the curvature radius defining these round parts R may match or may differ.

Furthermore, a width of the mount area MA, that is, a gap between the short sides SS12 and SS22 is similar to or less than a width of the long side of the non-display area NDA, that is, a gap between the long side LS11 and the long side LS21 (gap between the long side LS12 and the long side LS22).

The display panel PNL of the present embodiment may be a transmissive display panel which has a transmissive display function of displaying an image by selectively transmitting light from the back surface side of the first substrate SUB1. Alternatively, the display panel PNL may be a reflective display panel which has a reflective display function of displaying an image by selectively reflecting light from above the second substrate SUB2. Alternatively, the display panel PNL may be a transreflective display panel comprising the transmissive display function and a reflective display function.

FIG. 2 is a plan view showing an example of the structure of the display panel PNL of FIG. 1 in which the signal source is mounted.

As shown in FIG. 2, the display device DSP includes a flexible printed circuit F mounted in the mount area MA of the display panel PNL and an IC chip CP mounted on the flexible printed circuit F. The IC chip CP includes, for example, a display driver DD which output signals necessary for the image display. In the figure, the IC chip CP is depicted with one-dotted chain line and the display driver DD is depicted with a dashed line, and the structure thereof is a chip on film (COF) structure. Here, the display driver DD includes at least a part of a signal line drive circuit SD, scanning line drive circuit GD, and common electrode drive circuit CD which will be described later. Note that, other than the example depicted, the IC chip CP may be mounted in the mount area MA as in a chip on glass (COG) structure.

Figure 3:
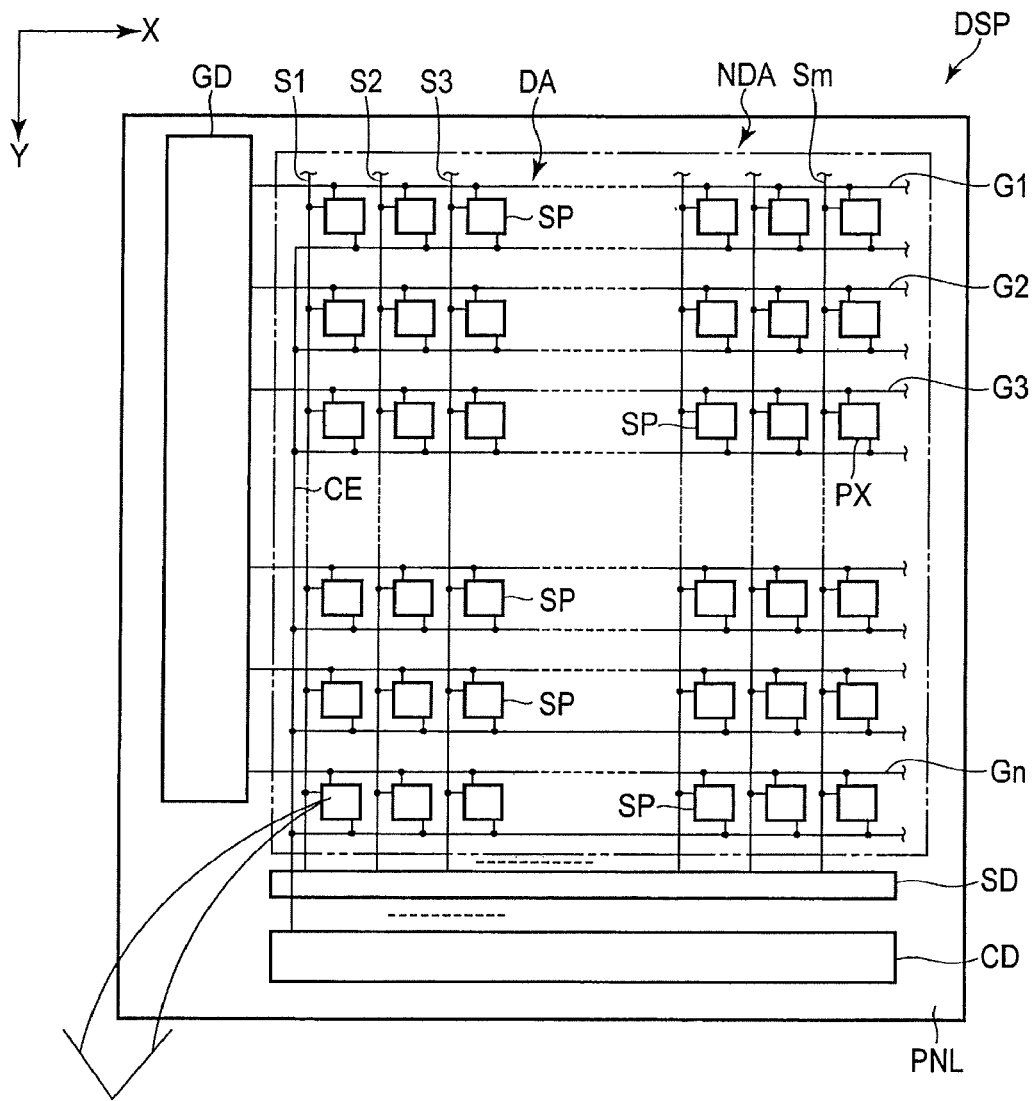
FIG. 3 shows a basic structure of the display panel of FIG. 1 and an equivalent circuit thereof.
Figure 3:
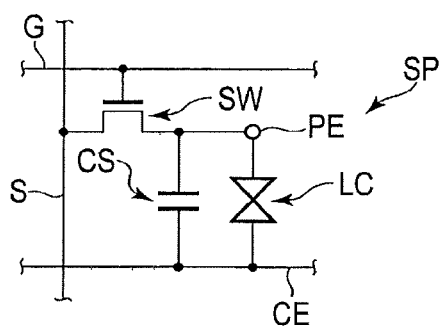

FIG. 3 shows a basic structure of the display panel PNL of FIG. 1 and an equivalent circuit thereof.

As shown in FIG. 3, the display panel PNL includes a plurality of subpixels SP in the display area DA. The subpixels SP are arranged in a matrix in the first direction X and the second direction Y. In the present embodiment, three subpixels SP adjacent to each other in the first direction X form a pixel. Furthermore, the display panel PNL includes a plurality of scanning lines G (G1 to Gn), a plurality of signal lines S (S1 to Sm), and common electrode CE in the display area DA. The scanning lines G each extend in the first direction X and are arranged in the second direction Y at intervals. The signal lines S each extend in the second direction Y and are arranged in the first direction X at intervals. Note that the scanning lines G and the signal lines S may not necessarily extend linearly and they may partly bend. The common electrode CE is disposed over the subpixels SP.

The scanning line G is connected to a scanning line drive circuit GD. The signal line S is connected to a signal line drive circuit SD. The common electrode CE is connected to a common electrode drive circuit CD. The signal line drive circuit SD, scanning line drive circuit GD, and common electrode drive circuit CD may be formed on the first substrate SUB1 in the non-display area NDA or may partly or entirely be included in the IC chip CP of FIG. 2. In this example, the scanning line drive circuit GD is, as depicted with a dashed line in FIG. 1, disposed between the long side LS1 and the long side LS11, and between the long side LS2 and the long side LS12. Note that the layout of drive circuits is not limited to the example depicted.

Each subpixel SP includes, for example, a switching element SW, pixel electrode PE, common electrode CE, and liquid crystal layer LC. The switching element SW is, for example, formed of a thin film transistor (TFT) and electrically connected to a scanning line G and a signal line S. The scanning line G is connected to a switching element SW in each of the subpixels SP arranged in the first direction X. The signal line S is connected to a switching element SW in each of the subpixels SP arranged in the second direction Y. The pixel electrode PE is electrically connected to the switching element SW. Each pixel electrode PE is opposed to the common electrode CE such that the liquid crystal layer LC is driven by an electric field produced between the pixel electrode PE and the common electrode CE. The capacitance CS is, for example, produced between an electrode having the same potential as the common electrode CE and an electrode having the same potential as the pixel electrode PE.

Note that, although the detailed structure of the display panel PNL will be omitted, in a display mode using a vertical electric filed along the normal of the substrate main surface or a display mode using an inclined electric field inclined with respect to the normal of the substrate main surface, the pixel electrode PE is disposed in the first substrate SUB1 while the common electrode CE is disposed in the second substrate SUB2. Furthermore, in a display mode using a lateral electric field along the substrate main surface, the pixel electrode PE and the common electrode CE are disposed in the first substrate SUB1. Furthermore, the display panel PNL may correspond to a display mode in which the vertical, lateral, and inclined electric fields are combined arbitrarily. Note that the substrate main surface corresponds to the X-Y plane defined by the first direction X and the second direction Y.

FIG. 4 is a plan view showing an example of the structure of a subpixel SP where the first substrate SUB1 of FIG. 1 is viewed from the second substrate SUB2 side. Note that only the elements necessary for the explanation are depicted, and elements such as pixel electrodes and common electrode are omitted.

As shown in FIG. 4, the first substrate SUB1 includes, for example, scanning lines G1 and G2, signal lines S1 and S2, and switching element SW.

The scanning lines G1 and G2 are arranged in the second direction Y at intervals and extend in the first direction X. The signal lines S1 and S2 are arranged in the first direction X at intervals and extend in the second direction Y. In the example depicted, the signal lines S1 and S2 extend while partly bending; however, they may extend linearly in the second direction Y. A subpixel SP corresponds to an area defined by the scanning lines G1 and G2 and the signal lines S1 and S2. Note that the shape of the subpixel SP is not limited to the example depicted, and may be a rectangle extending in the second direction Y and can be arbitrarily changed.

The switching element SW is electrically connected to the scanning line G1 and the signal line S1. In the example depicted, the switching element SW has a double gate structure. The switching element SW includes a semiconductor layer SC and a relay electrode RE. The semiconductor layer SC is disposed such that it partly overlaps the signal line S1 while the other part extend between the signal lines S1 and S2 to be a substantial U-shape. The semiconductor layer SC crosses the scanning line G1 in the area overlapping the signal line S1 and between the signal lines S1 and S2. In the present embodiment, the semiconductor layer SC crosses the scanning line G1 at two positions; however, it may cross the scanning line G1 at one position or at three positions.

In the scanning line G1, areas overlapping the semiconductor layer SC functions as gate electrodes GE1 and GE2. The semiconductor layer SC is electrically connected to the signal line S1 through a contact hole CH1 in its one end SCA and is electrically connected to the relay electrode RE through a contact hole CH2 in its other end SCB. The relay electrode RE is formed as an island shape and is disposed between the signal lines S1 and S2.

FIG. 5 is a plan view showing an example of the structure of the pixel electrode PE disposed in a subpixel SP. Note that only the elements necessary for the explanation are depicted, and elements such as scanning line and switching element are omitted.

As shown in FIG. 5, the pixel electrode PE is disposed between the signal lines S1 and S2. The pixel electrode PE includes a contact part PA and a main electrode part PB. The contact part PA and the main electrode part PB are formed integrally or continuously and are electrically connected together.

The contact part PA is disposed in a position overlapping the relay electrode RE and is electrically connected to the relay electrode RE through a contact hole CH3. The main electrode part PB has a shape along the signal lines S1 and S2, and in the example depicted, includes two slits PSL bending similarly as the signal line S1. Two slits PSL are arranged in the first direction X at intervals and have substantially the same width in the first direction X. Note that the shape of the pixel electrode PE is not limited to the example depicted, and it may be arbitrarily changed depending on the shape of the subpixel SP. Furthermore, the shape and the number of the slits PSL are not limited to the example depicted.

The common electrode CE overlaps the signal lines S1 and S2. The pixel electrode PE overlaps on the common electrode CE. The common electrode CE includes an opening OP in a position overlapping the relay electrode RE.

As described above, since the main electrode part PB (slit PSL) bends, a plurality of domains directors of which have different rotation directions can be set in the subpixels SP. Thus, the display panel PNL can achieve a good view angle performance.

Figure 6:
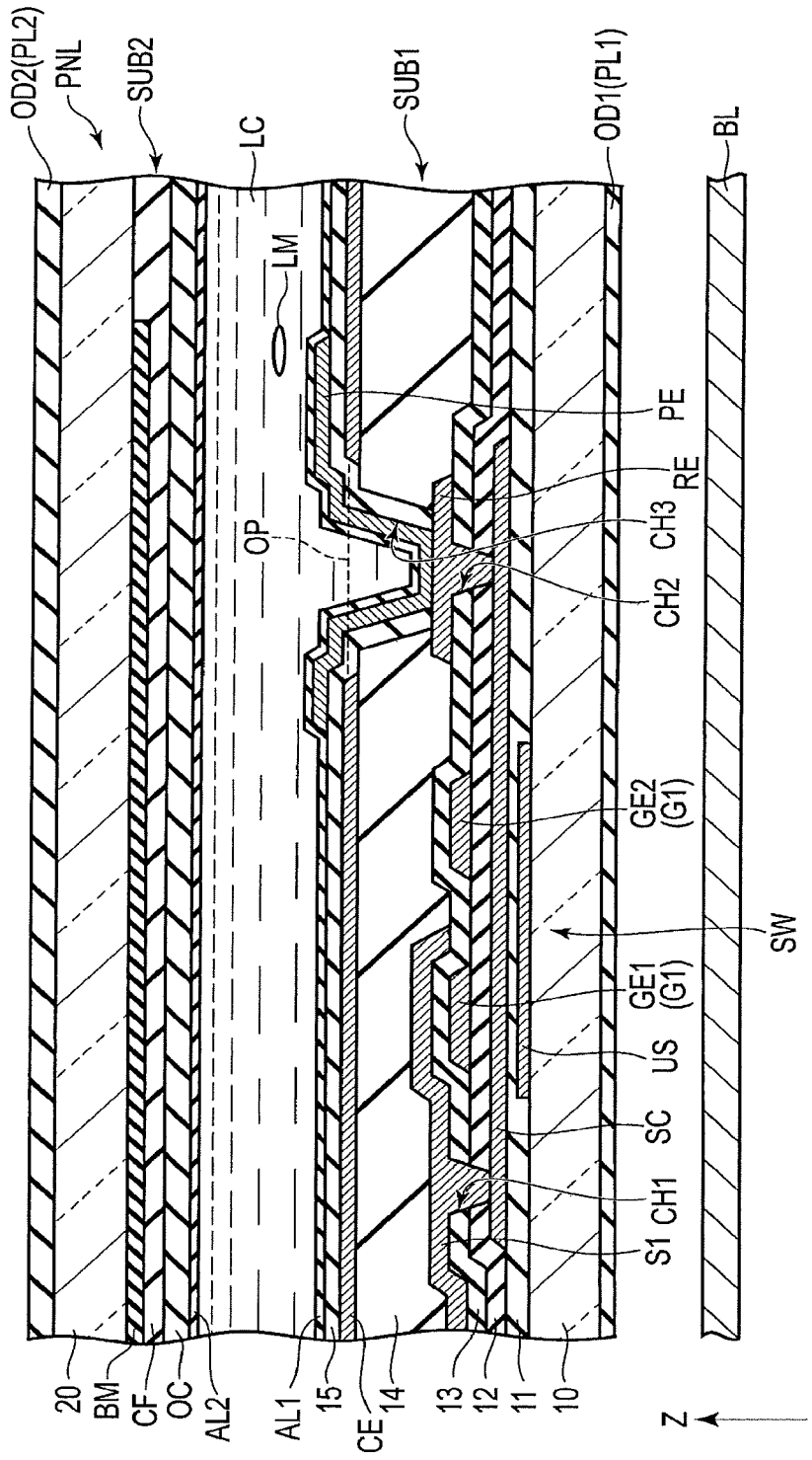
FIG. 6 is a cross-sectional view of the display panel taken along line VI-VI of FIG. 4.

FIG. 6 is a cross-sectional view of the display panel PNL taken along line VI-VI of FIG. 4. The example depicted corresponds to a fringe field switching (FFS) mode which is one of the display modes using a transverse field.

As shown in FIG. 6, the first substrate SUB1 includes, for example, a first insulating substrate 10, first insulating film 11, second insulating film 12, third insulating film 13, fourth insulating film 14, fifth insulating film 15, under light shielding layer US, semiconductor layer SC, scanning line G1, signal line S1, relay electrode RE, common electrode CE, pixel electrode PE, and first alignment film AL1.

The first insulating substrate 10 is a light transmissive substrate such as a glass substrate or a resin substrate. The under light shielding layer US is disposed on the first insulating substrate 10, and is covered with the first insulating film 11. The under light shielding layer US blocks the light from the backlight unit BL toward the semiconductor layer SC. The semiconductor layer SC is positioned above the first insulating film 11 and is covered with the second insulating film 12. The semiconductor layer SC is formed of, for example, a polycrystalline silicon, or may be formed of an amorphous silicon or a semiconductor oxide.

The gate electrode GE1 and GE2 which are a part of the scanning line G1 are positioned above the second insulating film 12 and are covered with the third insulating film 13. Note that the scanning line G2 which is not shown is disposed in the same layer where the scanning line G1 is disposed. The scanning line G1 is formed of a metal material such as aluminum (Al), titanium (Ti), silver (Ag), molybdenum (Mo), tungsten (W), copper (Cu), or chrome (Cr), or an alloy containing the aforementioned metal materials, and the scanning line G1 may have a monolayer structure or a multilayer structure. In the present embodiment, the scanning line G1 is formed of molybdenum tungsten (MoW). Note that the under light shielding layer US is, preferably, positioned directly below the semiconductor layer SC in the position opposed to the gate electrodes GE1 and GE2.

The signal line S1 and the relay electrode RE are positioned above the third insulating film 13 and are covered with the fourth insulating film 14. Note that the signal line S2 which is not shown is disposed in the same layer where the signal line S1 is disposed. The signal line S1 and the relay electrode RE are formed of the same material and the above metal materials can be adopted. The signal line S1 passes the contact hole CH1 passing through the second insulating film 12 and the third insulating film 13 and contacts the semiconductor layer SC. The relay electrode RE passes the contact hole CH2 passing through the second insulating film 12 and the third insulating film 13 and contacts the semiconductor layer SC.

The common electrode CE is positioned on the fourth insulating film 14 and is covered with the fifth insulating film 15. The pixel electrode PE is positioned on the fifth insulating film 15 and is covered with the first alignment film AL1. The pixel electrode PE is partly opposed to the common electrode CE. The common electrode CE and the pixel electrode PE are transparent electrodes formed of a transparent conductive material such as indium tin oxide (ITO), indium zinc oxide (IZO), or zinc oxide (ZnO). The pixel electrode PE contacts the relay electrode RE passing through the contact hole CH3 through the fourth insulating film 14 and the fifth insulating film 15 in the position overlapping the opening OP of the common electrode CE.

The first insulating film 11, second insulating film 12, third insulating film 13 and fifth insulating film 15 are inorganic insulating films formed of a material such as silicon oxide, silicon nitride, or silicon oxide nitride, and has a monolayer structure or a multilayer structure. The fourth insulating film 14 is an organic insulating film formed of a material such as an acrylic resin.

The second substrate SUB2 includes, for example, a second insulating substrate 20, light shielding layer BM, color filter CF, overcoat layer OC, and second alignment film AL2.

The second insulating substrate 20 is a light transmissive substrate such as a glass substrate or a resin substrate. The light shielding layer BM and the color filter CF are disposed on the second insulating substrate 20 in the side opposed to the first substrate SUB1. In the present embodiment, the light shielding layer BM is disposed in the position opposed to each of the lines such as the signal lines S1 and S2, scanning lines G1 and G2, and switching element SW of FIG. 4. In that case, the light shielding layer BM is formed as a lattice in the display area DA. Note that, unlike the present embodiment, the light shielding layer BM may be disposed in a position not opposed to the signal lines S1 and S2. In such a case, the light shielding layer BM extends in the first direction X and is formed as a stripe. In either case, the light shielding layer BM extends in the first direction X and is formed as a stripe.

The color filter CF is disposed in the position opposed to the pixel electrode PE and partly overlaps the light shielding layer BM. The color filter CF includes, for example, a red-colored layer, green-colored layer, and blue-colored layer, and may further include a different color layer or a transparent or white layer.

The overcoat layer OC covers the color filter CF. The overcoat layer OC is formed of a transparent resin. The second alignment film AL2 covers the overcoat layer OC. The first alignment film AL1 and the second alignment film AL2 are formed of, for example, a material which exhibits horizontal alignment property. In this example, as shown in FIG. 5, an alignment treatment direction AD1 of the first alignment film AL1 is parallel to the second direction Y and an alignment treatment direction AD2 of the second alignment film AL2 is parallel to and opposite to the alignment treatment direction AD1.

Note that the color filter CF may be disposed in the first substrate SUB1. The light shielding layer BM may be disposed between the color filter CF and the overcoat layer OC, or between the overcoat layer OC and the second alignment film AL2. Furthermore, instead of the light shielding layer BM, two or more color layers of different colors may be stacked to decrease the transmissivity and used as a light shielding layer. Furthermore, a white subpixel may be added, and a white color layer or a transparent layer may be disposed in the white subpixel. Or, the overcoat layer OC may be disposed without using the transparent layer.

The above first substrate SUB1 and the second substrate SUB2 are disposed such that the first alignment film AL1 and the second alignment film AL2 are opposed to each other. Although this is not depicted, a spacer is formed of a resin material and is disposed between the first substrate SUB1 and the second substrate SUB2. Thus, a certain cell gap is formed between the first alignment film AL1 and the second alignment film AL2. Note that, as a spacer other than the main spacer which forms a cell gap, a sub spacer which does not contact one of the substrates in a normal state where an external force is not applied to the display panel PNL. The cell gap is, for example, 2 to 5 µm. The first substrate SUB1 and the second substrate SUB2 are adhered together with a sealant provided with the non-display area NDA.

The liquid crystal layer LC is disposed between the first substrate SUB1 and the second substrate SUB2 and is held between the first alignment film AL1 and the second alignment film AL2. The liquid crystal layer LC includes liquid crystal molecules LM. The liquid crystal layer LC is formed of a positive (positive dielectric anisotropy) liquid crystal material or a negative (negative dielectric anisotropy) liquid crystal material.

A first optical element OD1 including a first polarizer PL1 is disposed below the first substrate SUB1. Furthermore, a second optical element OD2 including a second polarizer PL2 is disposed above the second substrate SUB2. In this example, the first polarizer PL1 and the second polarizer PL2 are disposed such that absorption axes thereof are orthogonal to each other on the X-Y plane. Note that the first optical element OD1 and the second optical element OD2 may include, if necessary, a diffusion layer, anti-reflection layer, or retardation plate such as a quarter-wavelength plate or a half-wavelength plate.

In such a structure, in an off state where a field is not formed between the pixel electrode PE and the common electrode CE, the liquid crystal molecules LM is initially aligned to a certain direction (for example, the second direction Y) between the first alignment film AL1 and the second alignment film AL2. In the off state, light irradiated from the backlight unit BL to the display panel PNL is absorbed by the first optical element OD1 and the second optical element OD2 and the display state becomes dark display. On the other hand, in an on state where a field is formed between the pixel electrode PE and the common electrode CE, the liquid crystal molecules LM are aligned in a direction which is different from the initial alignment direction by an electric field, and the alignment direction is controlled by the electric field. In the on state, light form the backlight unit BL partly passes the first optical element OD1 and the second optical element OD2 and the display state becomes bright display.

Figure 7:
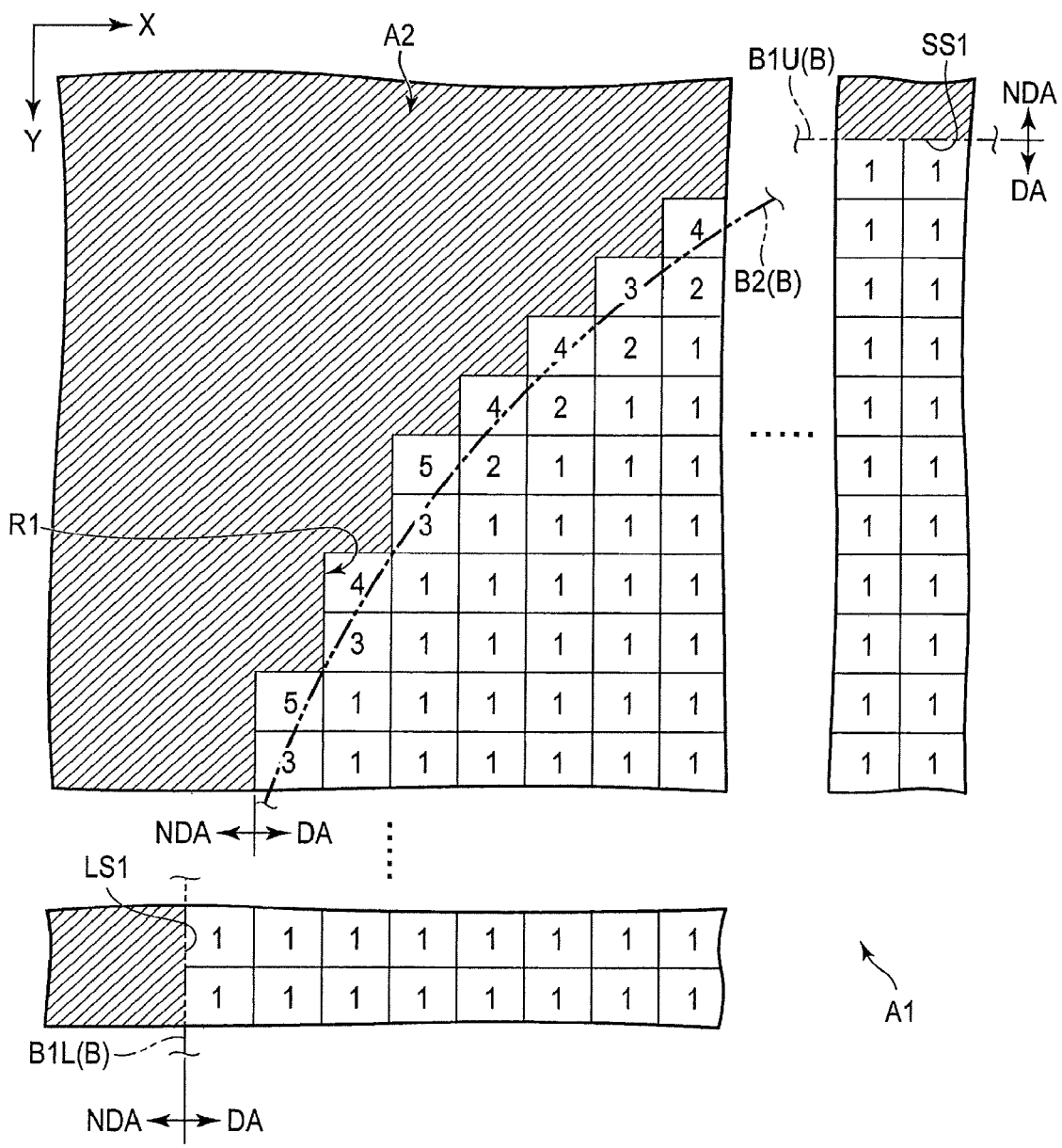
FIG. 7 is a plan view showing an area including a round part of a display area of the display panel in which a relationship between an ideal display area and a plurality of pixels is depicted.

FIG. 7 is a plan view showing an area including a round part R1 of the display area DA of the display panel PNL in which a relationship between an ideal display area and the pixels PX is depicted. Here, relationships between each of round parts R1 to R4 and the pixels PX are similar, and thus, the area close to the round part R1 will be explained as a typical example.

As shown in FIG. 7, the display device DSP includes a first area A1, second area A2 outside the first area A1, and boundary B of the first area A1 and the second area A2. The first area A1 is the ideal display area and the second area A2 is an ideal non-display area (light shielding area). The boundary B corresponds to an ideal outline of the display area. The boundary B includes a linear-shaped first boundary and a round-shaped second boundary connected to the first boundary. In the example depicted, the boundary B includes a first boundary B1I in the upper side of the first area A1, first boundary B1L in the left side of the first area A1, and second boundary B2 in the upper left side of the first area A1. Note that, although this is not shown, the second boundary B2 is connected to the first boundary B1U in the one end and to the first boundary B1L in the other end.

The pixels PX are arranged in the first direction X and the second direction Y. Note that each pixel PX includes subpixels SP of different colors. The pixels PX include first pixel PX1 positioned in the first area A1, and second pixel PX2, third pixel PX3, fourth pixel PX4, and fifth pixel PX5 positioned over the second boundary B2 (boundary B). In the figure, the first pixel PX1 is denoted 1, second pixel PX2 is denoted 2, third pixel PX3 is denoted 3, fourth pixel PX4 is denoted 4, and fifth pixel PX5 is denoted 5. Note that the display panel PNL is positioned in the second area A2 and does not include a pixel outside the first area A1.

The display area DA is an area in which the pixels PX are positioned, that is, the area denoted 1 to 5 in FIG. 7. Here, the liquid crystal layer LC is positioned at least in the first area A1. Specifically, the liquid crystal layer LC is positioned at least in the display area DA. The non-display area NDA is an area in which the pixels PX are not positioned in the second area A2, and is the area hatched in FIG. 7. Note that the non-display area NDA is light-shielded by the light shielding layer BM.

The pixels PX positioned at the upper end of the first area A1 include a plurality of first pixels PX1 and are aligned in the first direction X. The upper side the pixels PX in the upper end is positioned on the first boundary B1U. That is, if the upper side of the display area DA (short side SS1) is matched with the first boundary B1U, the ideal upper side of the display area DA is achieved.

The pixels PX positioned at the left end of the first area A1 include a plurality of first pixels PX1 and are aligned in the second direction Y. The left side of the pixels PX positioned in the left end are positioned on the first boundary B1L. That is, if the left side of the display area DA (long side LS1) is matched with the first boundary B1L, the ideal left side of the display area DA is achieved.

The round part R1 of the display area DA corresponds to a boundary between the area denoted by the numbers and the area hatched in FIG. 7, and thus, is not precisely round. The round part R1 of the display area DA is difficult to be matched with the second boundary B2. Thus, in the present embodiment, an aperture ratio of each of the second pixel PX2 to fifth pixel PX5 is lowered than an aperture ratio of the first pixel PX1. Note that the first pixel PX1 is a regular pixel and an aperture ratio of the first pixel PX1 is a regular aperture ratio. The aperture ratio of the second pixel PX2 is lower than the aperture ratio of the first pixel PX1. The aperture ratio of the third pixel PX3 is lower than the aperture ratio of the second pixel PX2. The aperture ratio of the fourth pixel PX4 is lower than the aperture ratio of the third pixel PX3. The aperture ratio of the fifth pixel PX5 is lower than the aperture ratio of the fourth pixel PX4.

In the present embodiment, pixels PX extend over the boundary B are the following four types; second pixel PX2, third pixel PX3, fourth pixel PX4, and fifth pixel PX5. Thus, the aperture ratio of the pixels PX extending over the boundary B is divided into four levels. The types of the pixels PX over the boundary B are determined based on a ratio of an area in the first area A1 and an area in the second area A2. The proportion that the third pixel PX3 is located in the second area A2 is larger than the proportion that the second pixel PX2 is located in the second area A2. The proportion that the fourth pixel PX4 is located in the second area A2 is larger than the proportion that the third pixel PX3 is located in the second area A2. The proportion that the fifth pixel PX5 is located in the second area A2 is larger than the proportion that the fourth pixel PX4 is located in the second area A2.

As described above, the aperture ratio of each pixel PX over the boundary B is adjusted to optically blur the outline of the round part R1 of the display area DA. In other words, the roughness of the outline of the round part R1 of the display area DA can be less recognized. Note that; (i) if the display panel PNL does not include the second pixel PX2 to fifth pixel PX5 extending over the boundary B, or (ii) if the second pixel PX2 to fifth pixel PX5 are replaced with the first pixel PX, the roughness of the outline of the round part R1 of the display area DA becomes more recognizable.

As described above, in the present embodiment, pixels PX of four types are positioned over the boundary B; however, no limitation is intended thereby and various changes can be applied. At least one type of pixel PX which has an aperture ratio lower than the aperture ratio of the regular first pixel PX1 may be position over the boundary B. For example, five or more types of pixels PX having relatively low aperture ratio may be positioned over the boundary B. Thereby, as in the present embodiment, the roughness of the outline of the round part R1 can be less recognized.

Figure 8:
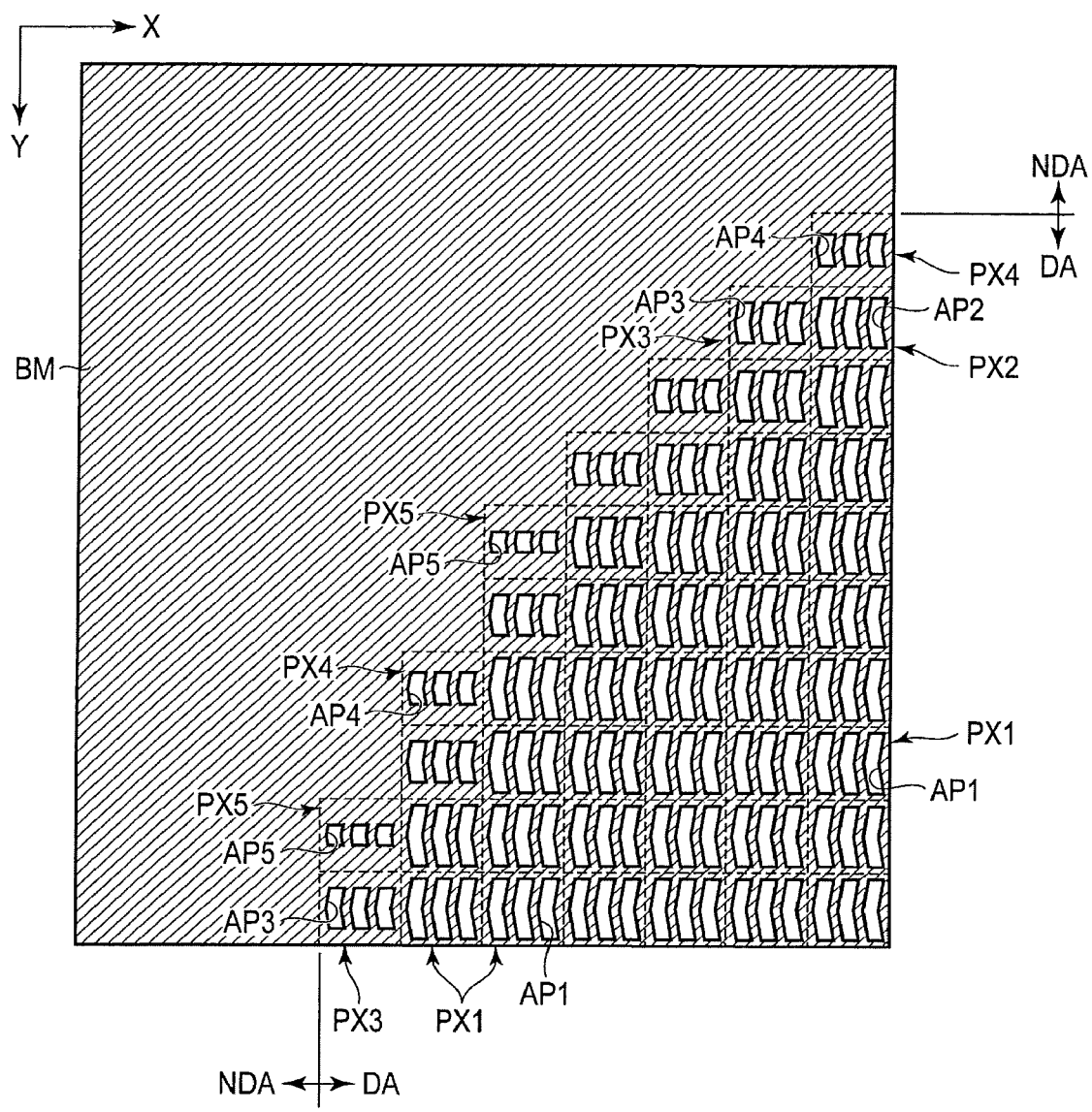
FIG. 8 is a plan view showing a part of the display area of the display panel of FIG. 7 in which a light shielding layer and openings of the pixels are depicted.

FIG. 8 is a plan view showing a part of the display area DA in the display panel PNL of FIG. 7 in which the light shielding layer BM and openings AP of the pixels PX are depicted.

As shown in FIG. 8, each pixel PX includes a plurality of openings AP. The opening AP may be referred to as an opening area. In the present embodiment, each pixel PX includes three subpixels SP, and thus, each pixel PX includes three openings AP. All the openings AP in each pixel PX have the same length in and the same position with respect to the second direction Y. Each opening AP is positioned in the center of the corresponding pixel PX in the second direction Y. The center of the opening AP in the second direction Y passes along a bisector which bisects the corresponding pixel PX in the second direction Y. The light shielding layer BM is disposed in the gaps among the openings AP in the display area and in the non-display area NDA. In the figure, the light shielding layer BM corresponds to the hatched area and the openings AP correspond to the area which is not hatched. For example, each opening AP is defined by the light shielding layer BM. The pixels PX are depicted with dashed lines.

Each first pixel PX1 includes three first openings AP1, each second pixel PX2 includes three second openings AP2, each third pixel PX3 includes three third openings AP3, each fourth pixel PX4 includes three fourth openings AP4, and each fifth pixel PX5 includes three fifth openings AP5. In the second direction Y, the second opening AP2 is shorter than the first opening AP1, the third opening AP3 is shorter than the second opening AP2, the fourth opening AP4 is shorter than the third opening AP3, and the fifth opening AP5 is shorter than the fourth opening AP4.

For example, if the shape of the light shielding layer BM is adjusted, the length of the openings AP in the second direction Y can be adjusted. From the above, in the present embodiment, the length of the openings AP in the second direction Y is adjusted in each pixel PX to adjust the aperture ratio of each pixel PX.

FIG. 9 is a plan view showing the first pixel PX1 in which the scanning lines G, signal lines S, pixel electrodes PE, and light shielding layer BM are depicted. Here, only the main elements necessary for the explanation are depicted. Note that, in the example depicted, the pixels PX including the first pixel PX1 have the structure corresponding to the FFS mode and the depiction of the common electrode is omitted. The scanning lines G and the signal lines S are disposed in the first substrate SUB1 while the light shielding layer BM is disposed in the second substrate SUB2. Note that the light shielding layer BM is depicted with two-dotted chain lines in the figure.

As shown in FIG. 9, the light shielding layer BM has a shape along the boundary of the subpixel SP. The light shielding layer BM functions as a light shield blocking at least the light irradiated from the backlight unit BL. The light shielding layer BM is formed of a high light absorbing material such as a black resin. Or, the light shielding layer BM is formed of a highly light reflective material such as a metal. The first opening AP1 is an area surrounded by the light shielding layer BM which is used for the image display. The light shielding layer BM includes a plurality of band-like first light shielding layers SH1 and a plurality of band-like second light shielding layers SH2. In the present embodiment, the first light shielding layer SH1 and the second light shielding layer SH2 are formed integrally.

The first light shielding layers SH1 extend in the first direction X and are arranged in the second direction Y at intervals. Each first light shielding layer SH1 extends along the scanning line G in the first direction X. The first light shielding layer SH1 is opposed to the scanning line G, end of the pixel electrode PE, and switching element SW. The second light shielding layer SH2 is opposed to the signal line S and extends along the signal line S.

The pixels PX including the first pixel PX1 each include subpixels SP of different colors. In the present embodiment, each pixel PX includes a first color subpixel SP1, second color subpixel SP2, and third color subpixel SP3. The first color is red, second color is green, and third color is blue.

Each of the subpixels SP1, SP2, and SP3 includes a first opening area J1 and a second opening area J2. When a voltage is applied to the liquid crystal layer LC, a rotation state of the liquid crystal molecules LM (alignment state) of the second opening area J2 is different from that of the first opening area J1. In each of the subpixels SP1, SP2, and SP3, the first opening area J1 and the second opening area J2 are continuous in the second direction Y. In the first pixel PX1, each first opening AP1 includes the continuous first opening area J1 and second opening area J2. Here, an imaginary line passing the boundary of the first opening area J1 and the second opening area J2 is hereinafter referred to as a reference line RL.

In the subpixels SP1, SP2, and SP3, the first opening area J1 extends in a fourth direction d4 which is different from the first direction X and the second direction Y, and the second opening area J2 extends in a fifth direction d5 which is different from the first direction X, second direction Y, and fourth direction d4.

In the pixels PX including the first pixel PX1, a first length of the first opening areas J1 in the second direction Y in the subpixels SP1, SP2, and SP3 is the same, and a second length of the second opening area J2 in the second direction Y in the subpixels SP1, SP2, and SP3 is the same. Furthermore, in the present embodiment, in the pixels PX including the first pixel PX1, the first length and the second length are the same.

Note that, unlike the present embodiment, the first length and the second length may differ.

In the first pixel PX1, a first length L1a of the first opening areas J1 in the second direction Y is the same, and a second length L2a of the second opening areas J2 in the second direction Y is the same. Furthermore, the first length L1a and the second length L2a are the same. The reference line RL showing the boundary of the first opening area J1 and the second opening area J2 passes the center part of the subpixel SP. A distance DIa in the second direction Y that passes the first pixel PX1 between a pair of the first light shielding layers SH1 adjacent to each other in the second direction Y is a sum of the first length L1a and the second length L2a.

Note that the first light shielding layers SH1 are disposed in the gaps among the openings AP (opening areas J1 and J2).

Furthermore, as described above, in the present embodiment, between the pixel electrode PE and the common electrode CE, the electrode close to the liquid crystal layer LC is the pixel electrode PE. Here, the pixel electrode PE is the upper electrode and the common electrode CE is the lower electrode. Note that, unlike the present embodiment, the common electrode CE may be disposed closer to the liquid crystal layer LC than the pixel electrode PE, and in that case, the common electrode CE is the upper electrode with slits and the pixel electrode PE is a plate-like lower electrode.

Furthermore, in the present embodiment, in the subpixels SP1, SP2, and SP3 of the first pixel PX1, the main electrode part PB of the pixel electrode PE is positioned in the first opening AP1. The main electrode part PB extends in the fourth direction d4 in the first opening area J1, bends on the reference line RL, and extends in the fifth direction d5 in the second opening area J2.

In a plan view where the subpixel SP1 is on the left and the subpixel SP3 is on the right, each main electrode part PB has a shape of a symbol <. Note that, unlike the present embodiment, each main electrode part PB may have a shape of a symbol >.

As can be understood from the shape of the first opening AP1 (first opening area J1 and second opening area J2) and the shape of the main electrode part PB, each of the opening areas J1 and J2 include a plurality of domains directors of which have different rotation directions. In the present embodiment, each of the subpixels SP1, SP2, and SP3 have four types of domains, and thus, the display panel PNL can achieve a good view angle performance.

Note that the shape and size of the pixel electrode PE is the same as to the first pixel PX1 to fifth pixel PX5.

FIG. 10 is a plan view showing the second pixel PX2 in which the scanning lines G, signal lines S, pixel electrodes PE, and light shielding layer BM are depicted. Here, only the main elements necessary for the explanation are depicted. Furthermore, a relationship between the second pixel PX2 and the first pixel PX1, and differences between the second pixel PX2 and the first pixel PX1 are mainly explained.

As shown in FIG. 10, the second opening AP2 is an area surrounded by the light shielding layer BM and is used for the image display. In the second pixel PX2, each of the second openings AP2 includes the continuous first opening area J1 and the second opening area J2.

In the second pixel PX2, a first length L1b of the first opening areas J1 in the second direction Y is the same, and a second length L2b of the second opening areas J2 in the second direction Y is the same. Furthermore, the first length L1b and the second length L2b are the same. A distance Dib in the second direction Y that passes the second pixel PX2 between a pair of the first light shielding layers SH1 adjacent to each other in the second direction Y is a sum of the first length L1b and the second length L2b.

In the first light shielding layer SH1, the part corresponding to the second pixel PX2 is expanded to the reference line RL side as compared to the part corresponding to the first pixel PX1. Thus, the first length L1b of the second pixel PX2 is less than the first length L1a of the first pixel PX1, and the second length L2b of the second pixel PX2 is less than the second length L2a of the first pixel PX1. The distance DIb passing the second pixel PX2 is less than the distance DIa passing the first pixel PX1.

When the opening areas J which are provided with the subpixels SP of the same color and have the same rotation direction of the liquid crystal molecules LM (alignment state) are compared, the opening area J of the second pixel PX2 is less than the opening area J of the first pixel PX1. For example, the first opening area J1 of the subpixel SP1 of the second pixel PX2 is less than the first opening area J1 of the subpixel SP1 of the first pixel PX1.

Furthermore, when the domains directors of which have the same rotation direction are compared in the comparison of the opening areas J, the size of the domain of the second pixel PX2 is less than the size of the domain of the first pixel PX1. In the present embodiment, when the aperture ratio of each subpixel SP1 of the second pixel PX2 is adjusted, the proportion of the domains should be maintained in each of the first opening area J1 and the second opening area J2. As can be understood from the above, when the aperture ratio of each subpixel SP1 of the second pixel PX2 is adjusted, preferably, the second light shielding layer SH2 is not expanded in the first direction X but the first light shielding layer SH1 is expanded in the second direction Y as in the present embodiment. Thus, the display panel PNL can achieve better view angle performance.

Note that, in the subpixels SP1, SP2, and SP3 of the second pixel PX2, the main electrode part PB of the pixel electrode PE is positioned in the second opening AP2.

Furthermore, referring to the first pixel PX1 and the second pixel PX2 arranged in the first direction X, in each the first pixel PX1 and the second pixel PX2, each reference line RL showing a boundary of the first opening area J1 and the second opening area J2 is a same straight line.

Figure 11:
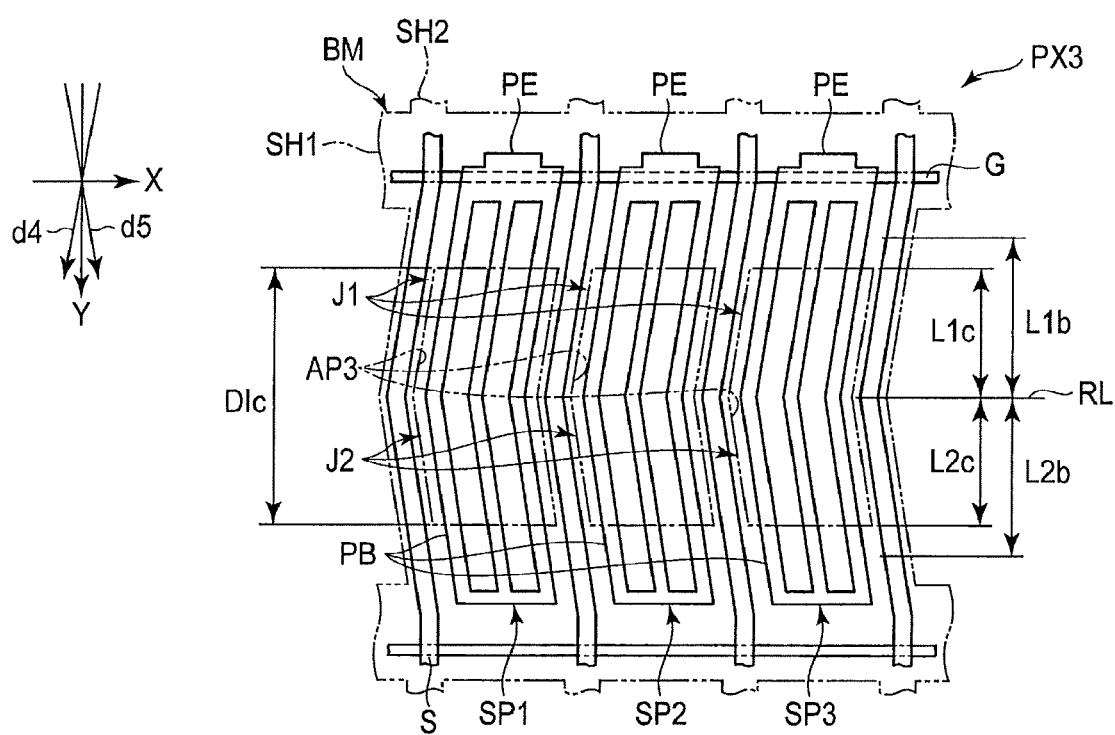
FIG. 11 is a plan view showing a third pixel of FIGS. 7 and 8 in which scanning lines, signal lines, pixel electrodes, and light shielding layer are depicted.

FIG. 11 is a plan view showing the third pixel PX3 in which the scanning lines G, signal lines S, pixel electrodes PE, and light shielding layer BM are depicted. Here, only the main elements necessary for the explanation are depicted. Furthermore, a relationship between the third pixel PX3 and the second pixel PX2 and differences between the third pixel PX3 and the second pixel PX2 are mainly explained.

As shown in FIG. 11, the third opening AP3 is an area surrounded by the light shielding layer BM and is used for the image display. In the third pixel PX3, each of the third openings AP3 includes the continuous first opening area J1 and the second opening area J2.

In the third pixel PX3, a first length L1c of the first opening areas J1 in the second direction Y is the same, and a second length L2c of the second opening areas J2 in the second direction Y is the same. Furthermore, the first length L1c and the second length L2c are the same. A distance DIc passing the third pixel PX3 between a pair of the first light shielding layers SH1 adjacent to each other in the second direction Y is a sum of the first length L1c and the second length L2c.

In the first light shielding layer SH1, the part corresponding to the third pixel PX3 is expanded to the reference line RL side as compared to the part corresponding to the second pixel PX2. Thus, the first length L1c of the third pixel PX3 is less than the first length L1b of the second pixel PX2, and the second length L2c of the third pixel PX3 is less than the second length L2b of the second pixel PX2. The distance DIc passing the third pixel PX3 is less than the distance DIb passing the second pixel PX2.

When the opening areas J which are provided with the subpixels SP of the same color and have the same rotation state of the liquid crystal molecules LM (alignment state) are compared, the opening area J of the third pixel PX3 is less than the opening area J of the second pixel PX2. For example, the first opening area J1 of the subpixel SP1 of the third pixel PX3 is less than the first opening area J1 of the subpixel SP1 of the second pixel PX2.

Furthermore, when the domains directors of which have the same rotation direction are compared in the comparison of the opening areas J, the size of the domain of the third pixel PX3 is less than the size of the domain of the second pixel PX2.

Note that, in the subpixels SP1, SP2, and SP3 of the third pixel PX3, the main electrode part PB of the pixel electrode PE is positioned in the third opening AP3.

FIG. 12 is a plan view showing the fourth pixel PX4 in which the scanning lines G, signal lines S, pixel electrodes PE, and light shielding layer BM are depicted. Here, only the main elements necessary for the explanation are depicted. Furthermore, a relationship between the fourth pixel PX4 and the third pixel PX3 and differences between the fourth pixel PX4 and the third pixel PX3 are mainly explained.

As shown in FIG. 12, the fourth opening AP4 is an area surrounded by the light shielding layer BM and is used for the image display. In the fourth pixel PX4, each of the fourth openings AP4 includes the continuous first opening area J1 and the second opening area J2.

In the fourth pixel PX4, a first length L1d of the first opening areas J1 in the second direction Y is the same, and a second length L2d of the second opening areas J2 in the second direction Y is the same. Furthermore, the first length L1d and the second length L2d are the same. A distance DId passing the fourth pixel PX4 between a pair of the first light shielding layers SH1 adjacent to each other in the second direction Y is a sum of the first length L1d and the second length L2d.

In the first light shielding layer SH1, the part corresponding to the fourth pixel PX4 is expanded to the reference line RL side as compared to the part corresponding to the third pixel PX3. Thus, the first length L1d of the fourth pixel PX4 is less than the first length L1c of the third pixel PX3, and the second length L2d of the fourth pixel PX4 is less than the second length L2c of the third pixel PX3. The distance DId passing the fourth pixel PX4 is less than the distance DIc passing the third pixel PX3.

When the opening areas J which are provided with the subpixels SP of the same color and have the same rotation state of the liquid crystal molecules LM (alignment state) are compared, the opening area J of the fourth pixel PX4 is less than the opening area J of the third pixel PX3. For example, the first opening area J1 of the subpixel SP1 of the fourth pixel PX4 is less than the first opening area J1 of the subpixel SP1 of the third pixel PX3.

Furthermore, when the domains directors of which have the same rotation direction are compared in the comparison of the opening areas J, the size of the domain of the fourth pixel PX4 is less than the size of the domain of the third pixel PX3.

Note that, in the subpixels SP1, SP2, and SP3 of the fourth pixel PX4, the main electrode part PB of the pixel electrode PE is positioned in the fourth opening AP4.

FIG. 13 is a plan view showing the fifth pixel PX5 in which the scanning lines G, signal lines S, pixel electrodes PE, and light shielding layer BM are depicted. Here, only the main elements necessary for the explanation are depicted. Furthermore, a relationship between the fifth pixel PX5 and the fourth pixel PX4 and differences between the fifth pixel PX5 and the fourth pixel PX4 are mainly explained.

As shown in FIG. 13, the fifth opening AP5 is an area surrounded by the light shielding layer BM and is used for the image display. In the fifth pixel PX5, each of the fifth opening AP5 includes the continuous first opening area J1 and the second opening area J2.

In the fifth pixel PX5, a first length L1e of the first opening areas J1 in the second direction Y is the same, and a second length L2e of the second opening areas J2 in the second direction Y is the same. Furthermore, the first length L1e and the second length L2e are the same. A distance DIe passing the fifth pixel PX5 between a pair of the first light shielding layers SH1 adjacent to each other in the second direction Y is a sum of the first length L1e and the second length L2e.

In the first light shielding layer SH1, the part corresponding to the fifth pixel PX5 is expanded to the reference line RL side as compared to the part corresponding to the fourth pixel PX4. Thus, the first length L1e of the fifth pixel PX5 is less than the first length L1d of the fourth pixel PX4, and the second length L2e of the fifth pixel PX5 is less than the second length L2d of the fourth pixel PX4. The distance DIe passing the fifth pixel PX5 is less than the distance DId passing the fourth pixel PX4.

When the opening areas J which are provided with the subpixels SP of the same color and have the same rotation state of the liquid crystal molecules LM (alignment state) are compared, the opening area J of the fifth pixel PX5 is less than the opening area J of the fourth pixel PX4. For example, the first opening area J1 of the subpixel SP1 of the fifth pixel PX5 is less than the first opening area J1 of the subpixel SP1 of the fourth pixel PX4.

Furthermore, when the domains directors of which have the same rotation direction are compared in the comparison of the opening areas J, the size of the domain of the fifth pixel PX5 is less than the size of the domain of the fourth pixel PX4.

Note that, in the subpixels SP1, SP2, and SP3 of the fifth pixel PX5, the main electrode part PB of the pixel electrode PE is positioned in the fifth opening AP5.

In the above-structured display device DSP of the first embodiment, the pixels PX include the first pixel PX1 positioned in the first area A1 and the second pixel PX2 positioned over the boundary B. When the opening areas J which are provided with the subpixels SP of the same color and have the same rotation state of the liquid crystal molecules LM (alignment state) are compared, the opening area J of the second pixel PX2 is less than the opening area J of the first pixel PX1.

When the aperture ratio of each pixel PX over the boundary B such as the second pixel PX2 is adjusted, the roughness of the outline of the round parts R1 to R4 of the display area DA can be less recognized. Furthermore, when the aperture ratio of the second pixel PX2 is adjusted, both the first opening area J1 and the second opening area J2 are reduced. The proportion of the first opening area J1 of the first pixel PX1 and the first opening area J1 of the second pixel PX2 is the same as the proportion of the second opening area J2 of the first pixel PX1 and the second opening area J2 of the second pixel PX2. Thus, the display panel PNL can achieve a good view angle performance in the round parts R1 to R4.

As can be understood from the above, the display device DSP of good display quality can be achieved.

Variation of First Embodiment

Now, a variation of the first embodiment will be explained. FIG. 14 is a plan view of a sixth pixel PX6 of the display device DSP of a variation according to the first embodiment in which the scanning lines G, signal lines S, pixel electrodes PE, and light shielding layer BM are depicted.

As shown in FIG. 14, in the display device DSP of the variation, instead of four types of the pixels PC, five types of pixels PX are positioned over the boundary B, and in this respect, the variation differs from the first embodiment. The display panel PNL further includes a sixth pixel PX6 over the boundary B. The proportion that the sixth pixel PX6 is located in the second area A2 is larger than the proportion that the fifth pixel PX5 is located in the second area A2. The sixth pixel PX6 is formed of the subpixels SP1, SP2, and SP3 of the fifth pixel PX5 with a light shielding layer MS added thereto. The light shielding layer MS is positioned in a sixth opening AP6 of each subpixel SP of the sixth pixel PX6. The light shielding layer MS is, preferably, disposed evenly in the first opening area J1 and the second opening area J2.

Referring to FIG. 6, the light shielding layer MS is disposed in the first insulating substrate 10 side as compared to the fourth insulating film 14. This is because flatness of the surface of the first substrate SUB1 in the side contacting the liquid crystal layer LC is not harmed. Furthermore, since the light shielding layer MS is positioned in the sixth opening AP6, the light shielding layer MS is required to have a low light reflectivity. Thus, the light shielding layer MS is, preferably, formed of a high light absorbing material such as a black resin or a low light reflective material such as a metal.

Specifically, the light shielding layer MS is disposed in the same layer where the under light shielding layer US is disposed and is formed of the same material used in the under light shielding layer US. Or, the light shielding layer MS is disposed in the same layer where the scanning line G is disposed and is formed of the same material used in the scanning line G. Or, the light shielding layer MS is dispose in the same layer where the signal line S is disposed and is formed of the same material used in the signal line S.

For example, if the scanning line G is formed of molybdenum tungsten (MoW) and the signal line S is formed of aluminum, the light shielding layer MS is formed with the scanning line G at the same time. This is because the scanning line G has lower light reflectivity than that of the signal line S.

With the light shielding layer MS provided with the sixth pixel PX6, the aperture ratio of the sixth pixel PX6 is less than the aperture ratio of the fifth pixel PX5.

In the above-structured display device DSP of the variation of the first embodiment, the advantages obtained in the first embodiment can be achieved. Furthermore, the aperture ratio of the pixel PX can be adjusted using a member such as the light shielding layer MS which is other than the light shielding layer BM.

Second Embodiment

Now, a display device DSP of the second embodiment will be explained. In the first embodiment, the light shielding layer BM is partly expanded in relation to the pixel PX to adjust the aperture ratio of the pixel PX. However, in the present embodiment, the light shielding layer BM is not expanded but the shape of the pixel electrode PE is changed in relation to the pixel PX to adjust the aperture ratio of the pixel PX. The shape of the pixel electrode PE differs in the first pixel PX1 to the fifth pixel PX5. FIG. 15 is a plan view showing a first pixel PX1 of the display device DSP of the second embodiment in which the scanning lines G, signal lines S, pixel electrodes PE, and light shielding layer BM are depicted. Here, only the main elements necessary for the explanation are depicted.

As shown in FIG. 15, in the entire pixels PX including the first pixel PX1, each of the subpixels SP1, SP2, and SP3 includes a first opening AP1. Furthermore, in the entire pixels PX, the first openings AP1 of the subpixels SP1, SP2, and SP3 have the same length in the second direction Y.

In the subpixels SP1, SP2, and SP3 of the first pixel PX1, the main electrode part PB of the pixel electrode PE is positioned in the first opening AP1. Note that the main electrode part PB corresponds to an area of the pixel electrode PE where slits are formed.

In the first pixel PX1, a first length La1 of the main electrode part PB positioned in each of the first opening areas J1 in the second direction Y is the same, and a second length Lb1 of the main electrode part PB positioned in each of the second opening areas J2 in the second direction Y is the same. Furthermore, the first length La1 and the second length Lb1 are the same. In the first pixel PX1, a distance DB of the main electrode part PB positioned in the first opening AP1 in the second direction Y is a sum of the first length La1 and the second length Lb1.

Figure 16:
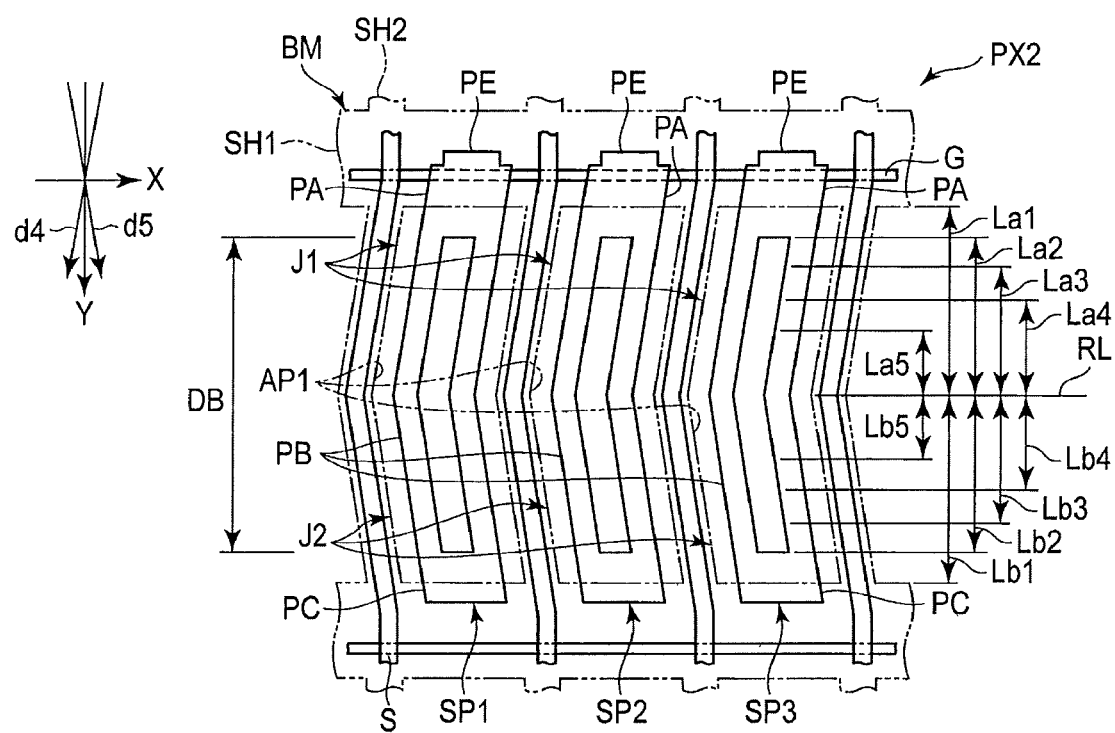
FIG. 16 is a plan view showing a second pixel of the display device of the second embodiment in which scanning lines, signal lines, pixel electrodes, and light shielding layer are depicted.

FIG. 16 is a plan view showing the second pixel PX2 of the display device DSP of the second embodiment in which the scanning lines G, signal lines S, pixel electrodes PE, and light shielding layer BM are depicted. Here, only the main elements necessary for the explanation are depicted. Furthermore, a relationship between the second pixel PX2 and the first pixel PX1 and differences between the second pixel PX2 and the first pixel PX1 are mainly explained.

As shown in FIG. 16, in the second pixel PX2, each of the subpixels SP1, SP2, and SP3 includes a first opening AP1. In the subpixels SP1, SP2, and SP3 of the second pixel PX2, with respect to the pixel electrode PE, not only the main electrode part PB but also the contact part PA and the other end part PC are positioned in the first opening AP1.

In the second pixel PX2, a first length La2 of the main electrode part PB positioned in each of the first opening areas J1 in the second direction Y is the same, and a second length Lb2 of the main electrode part PB positioned in each of the second opening areas J2 in the second direction Y is the same. Furthermore, the first length La2 and the second length Lb2 are the same. In the second pixel PX2, a distance DB of the main electrode part PB positioned in each of the first openings AP1 in the second direction Y is a sum of the first length La2 and the second length Lb2. The distance DB of the second pixel PX2 is less than the distance DB of the first pixel PX1. Thus, the first length La2 of the second pixel PX2 is less than the first length La1 of the first pixel PX1, and the second length Lb2 of the second pixel PX2 is less than the second length Lb1 of the first pixel PX1.

Note that the above relationship is applied to the third pixel PX3 to fifth pixel PX5. The distance DB of the third pixel PX3 is less than the distance DB of the second pixel PX2, the distance DB of the fourth pixel PX4 is less than the distance DB of the third pixel PX3, and the distance DB of the fifth pixel PX5 is less than the distance DB of the fourth pixel PX4. Thus, the first length La3 of the third pixel PX3 is less than the first length La2 of the second pixel PX2, and the second length Lb3 of the third pixel PX3 is less than the second length Lb2 of the second pixel PX2. The first length La4 of the fourth pixel PX4 is less than the first length La3 of the third pixel PX3, and the second length Lb4 of the fourth pixel PX4 is less than the second length Lb3 of the third pixel PX3. The first length La5 of the fifth pixel PX5 is less than the first length La4 of the fourth pixel PX4, and the second length Lb5 of the fifth pixel PX5 is less than the second length Lb4 of the fourth pixel PX4.

With the above-structured display device DSP of the second embodiment, the pixel electrode PE is an upper electrode. When the opening areas J which are provided with the subpixels SP of the same color and have the same rotation state of the liquid crystal molecules LM (alignment state) are compared, the shape of the pixel electrode PE in each of the opening areas J of the second pixel PX2 is different from the shape of the pixel electrode PE in each of the opening areas J of the first pixel PX1, and the aperture ratio of each of the opening areas J of the second pixel PX2 is less than the aperture ratio of each of the opening areas J of the first pixel PX1. Since the aperture ratio of each of the pixels PX over the boundary B such as the aperture ratio of the second pixel PX2 can be adjusted, the advantages obtained in the first embodiment can be achieved.

As can be understood from the above, in the second embodiment, a display device DSP of good display quality can be achieved.

Variation of Second Embodiment

Figure 17:
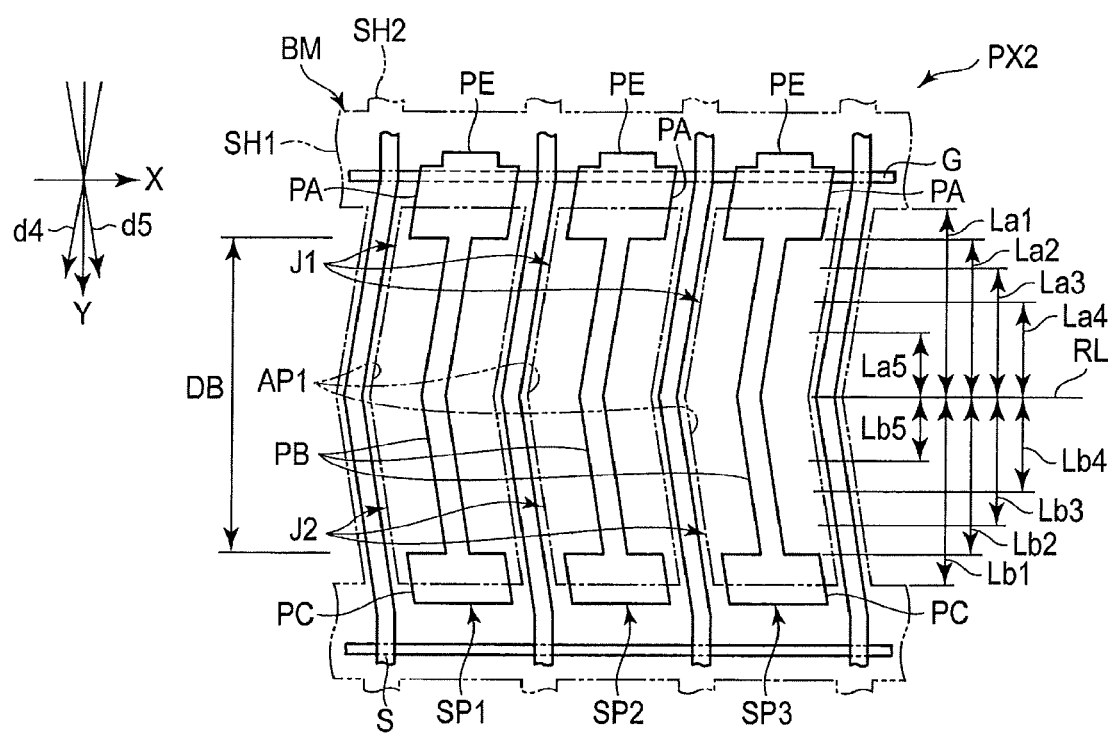
FIG. 17 is a plan view showing a second pixel of the display device of a variation according to the second embodiment in which scanning lines, signal lines, pixel electrodes, and light shielding layer are depicted.

Now, a variation of the second embodiment will be explained. FIG. 17 is a plan view of a second pixel PX2 of the display device DSP of a variation according to the second embodiment in which the scanning lines G, signal lines S, pixel electrodes PE, and light shielding layer BM are depicted.

As shown in FIG. 17, in the display device DSP of the variation, the pixel electrode PE is formed without a slit, and in this respect, the variation differs from the second embodiment. In the variation, the main electrode part PB corresponds to a thin electrode between the contact part PA and the other end part PC. The main electrode part PB is thinner than the contact part PA and the other end part PC. In other words, the width of the main electrode part PB in the first direction X is less than the width of the contact part PA in the first direction X and is less than the width of the other end part PC in the first direction X.

With the above-structured display device DSP of the variation according to the second embodiment, the advantages obtained in the second embodiment can be achieved.

Here, the second embodiment and the variation of the second embodiment may be combined. Specifically, the pixel PX of the second embodiment and the pixel PX of the variation according to the second embodiment may be combined together to adjust the aperture ratio of each pixel PX over the boundary B.

Third Embodiment

Now, a display device DSP of the third embodiment will be explained. In the first and second embodiments, the opening AP and the pixel electrode PE have the shape of a symbol <, and a view angle performance is compensated with one pixel PX. However, in the present embodiment, the shape of the pixel PX is different from that of the first embodiment, and thus, two adjacent pixels PX are combined to compensate the view angle performance. FIG. 18 shows a pixel arrangement of a display panel PNL of the display device DSP of the third embodiment.

As shown in FIG. 18, the pixels PX are classified into two types of pixels; main pixels MPX1 and MPX2. Two main pixels MPX1 and MPX2 adjacent to each other in the second direction Y form a unit pixel UPX. The main pixels MPX1 and MPX2 each correspond to a minimum unit to display a color image. The main pixel MPX1 includes subpixels SP1Ra, SP2Ga, and SP3Ba. The main pixel MPX2 includes subpixels SP1Rb, SP2Gb, and SP3Bb. Furthermore, the shape of the subpixel SP is, as depicted, a substantial parallelogram.

The subpixels SP1Ra and SP1Rb are first color subpixels and include a first colored layer CF1. The subpixels SP2Ga and SP2Gb are second color subpixels which are different from the first color and include a second colored layer CF2. The subpixels SP3Ba and SP3Bb are third color subpixels which are different from the first color and the second color and include a third colored layer CF3.

Note that the main pixels MPX1 and MPX2 may include a subpixel which displays a color other than red, green, and blue, or the subpixels of red, green, and blue may be replaced with subpixels of other colors.

The main pixels MPX1 are arranged repeatedly in the first direction X. Similarly, the main pixels MPX2 are arranged repeatedly in the first direction X. The line of the main pixels MPX1 in the first direction X and the line of the main pixels MPX2 in the first direction X are arranged alternately in the second direction Y. The colored layers CF1 to CF3 are arranged corresponding to the layout of the subpixels, and have the area corresponding to the size of the subpixels. In the present embodiment, the colored layers CF1 to CF3 are each formed in a stripe shape, extend in the second direction Y while bending, and are arranged in the first direction X.

If the shape of the subpixel SP is a substantial parallelogram as in the figure, two main pixels of the main pixels MPX1 and MPX2 are combined to form a large number of domains in subpixels of different colors, and the view angle performance can be compensated. Thus, referring to the view angle performance, a unit pixel UPX in which the main pixels MPX1 and MPX2 corresponds to a minimum unit to display a color image.

FIG. 19 is a plan view showing a unit pixel UPX of the display panel PNL of the third embodiment in which the scanning lines G, signal lines S, pixel electrodes PE, and light shielding layer BM are depicted. Note that, in FIG. 19, only the elements necessary for the explanation are depicted, and the elements such as color filter CF and common electrode CE are omitted. Furthermore, in FIG. 19, each of the main pixels MPX1 and MPX2 of the unit pixel UPX is the first pixel PX1.

As shown in FIG. 19, the signal lines S basically extend in the second direction while partly bending. In the example depicted, the signal line S extends in the fourth direction d4 and the fifth direction d5 between two adjacent scanning lines G. In the figure, the subpixel SP corresponds to an area defined by two adjacent scanning lines G and two adjacent signal lines S.

Each pixel electrode PE, especially, each main electrode PB extends in the fourth direction d4 or in the fifth direction d5. Slits of the pixel electrode PE extend in the fourth direction d4 or in the fifth direction d5. Between two adjacent scanning lines G, the main electrode part PB has a shape along the signal line S, and the signal line S and the pixel electrode PE (main electrode part PB) extend in parallel.

In the example depicted, the first opening AP1 and the main electrode part PB of the main pixel MPX1 extend in the fourth direction d4. On the other hand, the first opening AP1 and the main electrode part PB of the main pixel MPX2 extend in the fifth direction d5.

In each of the subpixels SP1Ra, SP2Ga, and SP3Ba of the main pixel MPX1, each first opening AP1 includes the first opening area J1 but does not include a second opening area J2. In each of the subpixels SP1Rb, SP2Gb, and SP3Bb of the main pixel MPX2, each first opening AP1 includes the second opening area J2 but does not include a first opening area J1.

As can be understood from the above, when the main pixel MPX1 and the main pixel MPX2 are combined, a plurality of domains directors of which have different rotation directions can be provided with each color. Thus, the display panel PNL can achieve a good view angle performance.

The subpixels SP1Ra, SP2Ga, and SP3Ba of the main pixel MPX1 have the first opening area J1 in the center of the subpixels. The subpixels SP1Rb, SP2Gb, and SP3Bb of the main pixel MPX2 have the second opening area J2 in the center of the subpixels. In the main pixel MPX1 which is a first pixel PX1, the first opening areas J1 (first openings AP1) have the same first length L1a in the second direction Y. In the main pixel MPX2 which is a first pixel PX1, the second opening areas J2 (first openings AP1) have the same first length L2a in the second direction Y. The first length L1a and the second length L2a are the same. Furthermore, each of the first length L1a and the second length L2a is equal to a distance between a pair of adjacent first light shielding layer s SH1 in the second direction Y.

As described above, the main pixel MPX1 and the main pixel MX2 which are first pixels PX1 are explained with reference to FIG. 19. Now, a second pixel PX2 will be explained with reference to FIG. 20. FIG. 20 is a plan view showing the second pixel PX2 of the third embodiment, in which the scanning lines G, signal lines S, pixel electrodes PE, and light shielding layer BM are depicted. Here, only the main elements necessary for the explanation are depicted, and the second pixel PX2 is the main pixel MPX1 in this example. Furthermore, a relationship between the second pixel PX2 and the first pixel PX1 and differences between the second pixel PX2 and the first pixel PX1 are mainly explained.

As shown in FIG. 20, in the second pixel PX2, each of the subpixels SP1Ra, SP2Ga, and SP3Ba includes a second opening AP2. In the subpixels SP1, SP2, and SP3 of the second pixel PX2, with respect to the pixel electrode PE, the main electrode part PB is positioned in the second opening AP2.

In the second pixel PX2, a first length L1b of the main electrode part PB positioned in each of the first opening areas J1 in the second direction Y is the same. The first length L1b of the second pixel PX2 is less than the first length L1a of the first pixel PX1.

Note that the above relationship is applied to the third pixel PX3 to fifth pixel PX5. The first length L1c of the third pixel PX3 is less than the first length L1b of the second pixel PX2, the first length L1d of the fourth pixel PX4 is less than the first length L1c of the third pixel PX3, and the first length L1e of the fifth pixel PX5 is less than the first length L1d of the fourth pixel PX4.

Furthermore, as to a distance between a pair of adjacent first light shielding layer SH1 in the second direction Y, the distance passing the first pixel PX1 corresponds to the first length L1a, the distance passing the second pixel PX2 corresponds to the first length L1b, the distance passing the third pixel PX3 corresponds to the first length L1c, the distance passing the fourth pixel PX4 corresponds to the first length L1d, and the distance passing the fifth pixel PX5 corresponds to the first length L1e.

When the opening areas J which are provided with the subpixels SP of the same color are compared, each of the opening areas J of the second pixel PX2 is less than each of the opening areas J of the first pixel PX1, each of the opening areas J of the third pixel PX3 is less than each of the opening areas J of the second pixel PX2, each of the opening areas J of the fourth pixel PX4 is less than each of the opening areas J of the third pixel PX3, and each of the opening areas J of the fifth pixel PX5 is less than each of the opening areas J of the fourth pixel PX4. For example, the first opening area J1 of the main pixel MPX1 which is a second pixel PX2 is less than the first opening area J1 of the main pixel MPX1 which is a first pixel PX1 of FIG. 19 and the second opening area J2 of the main pixel MPX2 which is the first pixel PX1.

Furthermore, when the domains directors of which have the same rotation direction are compared in the comparison of the opening areas J, the domain of the second pixel PX2 is, preferably, less than the domain of the first pixel PX1, the domain of the third pixel PX3 is, preferably, less than the domain of the second pixel PX2, the domain of the fourth pixel PX4 is, preferably, less than the domain of the third pixel PX3, and the domain of the fifth pixel PX5 is, preferably, less than the domain of the fourth pixel PX4.

Figure 21:
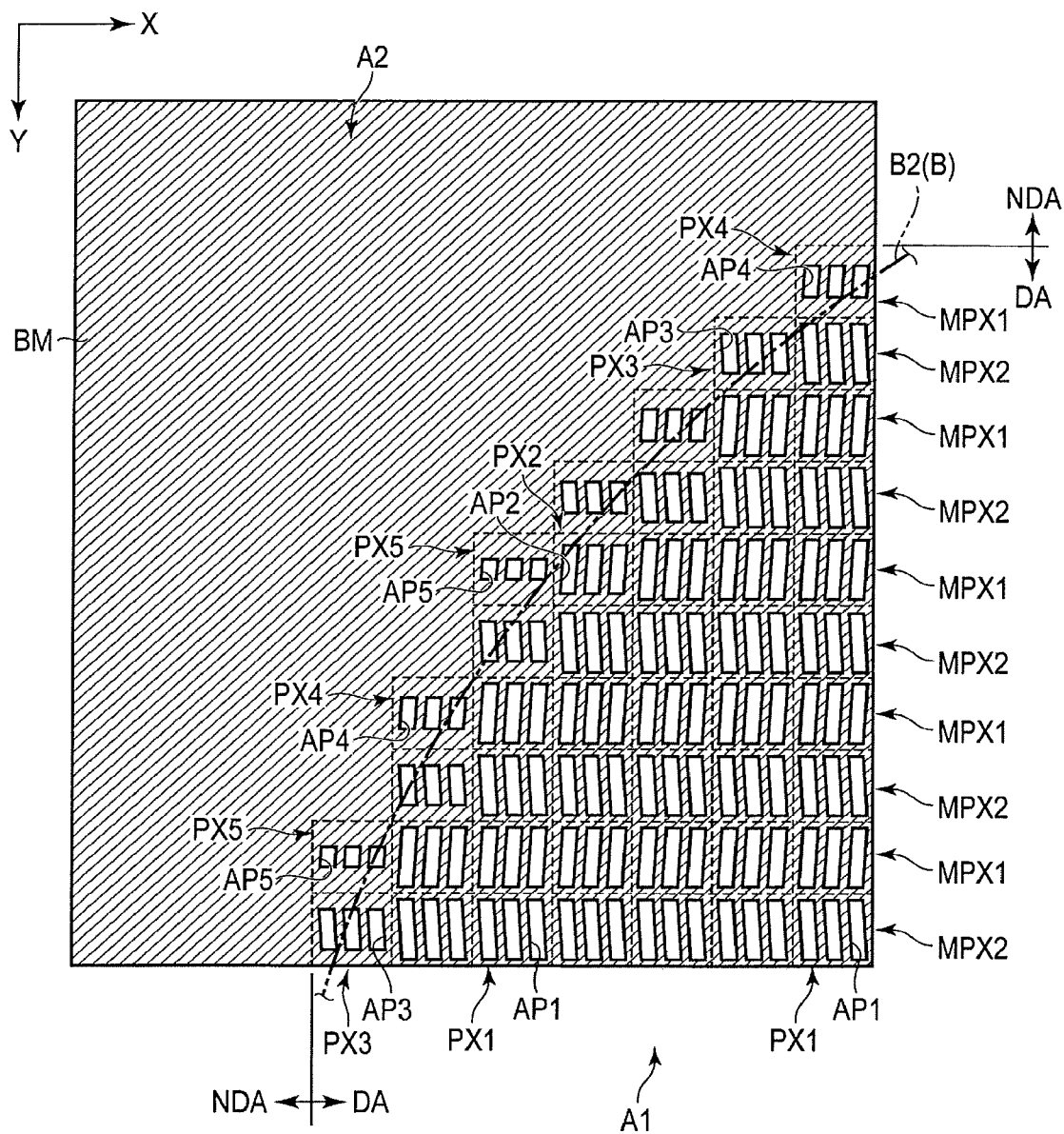
FIG. 21 is a plan view showing an area including a round part of a display area of the display panel of the third embodiment in which a light shielding layer and openings of pixels are depicted.

FIG. 21 is a plan view showing an area including a round part R1 of the display area DA of the display panel PNL of the third embodiment in which the light shielding layer BM and the openings AP of the pixels are depicted.

As shown in FIG. 21, the pixels PX are arranged in the first direction X and the second direction Y. The pixels PX include a first pixel PX1 positioned in the first area A1, and second pixel PX2, third pixel PX3, fourth pixel PX4, and fifth pixel PX5 positioned over the second boundary B2 (boundary B). The display area DA is an area where the pixels PX are positioned and the non-display area NDA is an area of the second area A2 where the pixels PX are not positioned.

In the pixels PX arranged in the first direction X, the center position of the opening AP (opening area J) of each pixel PX in the second direction Y is aligned in the first direction X.

In the present embodiment, when the aperture ratio of each pixel PX over the boundary B is adjusted, the roughness of the outline of the round parts of the display area DA can be less recognized.

With the above-structured display device DSP of the third embodiment, between a pair of adjacent pixels PX in the second direction Y, each of subpixels SP of one pixel PX has a first opening area J1 and each of subpixels SP of the other pixel PX has a second opening area J2. The pixels PX include, for example, a first pixel PX1 and a second pixel PX2 positioned over the boundary B. When the opening areas J which are provided with the subpixels SP of the same color are compared, each of the opening areas J of the second pixel PX2 is less than each of the opening areas J of the first pixel PX1. Since the aperture ratio of each of the pixels PX over the boundary B such as the aperture ratio of the second pixel PX2 can be adjusted, the advantages obtained in the first embodiment can be achieved.

As can be understood from the above, a display device DSP of good display quality can be achieved in the third embodiment.

Variation of Third Embodiment

Now, a variation of the third embodiment will be explained. FIG. 22 is a plan view showing a second pixel PX2 of a display panel PNL of the display device DSP of a variation according to the third embodiment, in which the scanning lines G, signal lines S, pixel electrodes PE, and light shielding layer BM are depicted. Here, only the main elements necessary for the explanation are depicted.

As shown in FIG. 22, in the third embodiment, the light shielding layer BM is partly expanded in relation to the pixel PX to adjust the aperture ratio of the pixel PX. However, in this variation, the light shielding layer BM is not expanded but the shape of the pixel electrode PE is changed in relation to the pixel PX to adjust the aperture ratio of the pixel PX. The shape of the pixel electrode PE differs in the first pixel PX1 to the fifth pixel PX5.

A first length La2 of the main electrode part PB in the second direction Y positioned in each of the first opening areas J1 (first opening AP1) of the second pixel PX2 is less than a first length La1 of the main electrode part PB in the second direction Y positioned in each of the first opening areas J1 (first opening AP1) of the first pixel PX1.

Similarly, a first length La3 of the main electrode part PB in the second direction Y positioned in each of the first opening areas J1 (first opening AP1) of the third pixel PX3 is less than a first length La2 of the main electrode part PB in the second direction Y positioned in each of the first opening areas J1 (first opening AP1) of the second pixel PX2.

A first length La4 of the main electrode part PB in the second direction Y positioned in each of the first opening areas J1 (first opening AP1) of the fourth pixel PX4 is less than a first length La3 of the main electrode part PB in the second direction Y positioned in each of the first opening areas J1 (first opening AP1) of the third pixel PX3.

A first length La5 of the main electrode part PB in the second direction Y positioned in each of the first opening areas J1 (first opening AP1) of the fifth pixel PX5 is less than a first length La4 of the main electrode part PB in the second direction Y positioned in each of the first opening areas J1 (first opening AP1) of the fourth pixel PX4.

With the above-structured display device DSP of the variation according to the third embodiment, the advantages obtained in the third embodiment can be achieved.

Here, the third embodiment and the variation of the third embodiment may be combined. Specifically, the pixel PX of the third embodiment and the pixel PX of the variation according to the third embodiment may be combined together to adjust the aperture ratio of each pixel PX over the boundary B.

Fourth Embodiment

Figure 23:
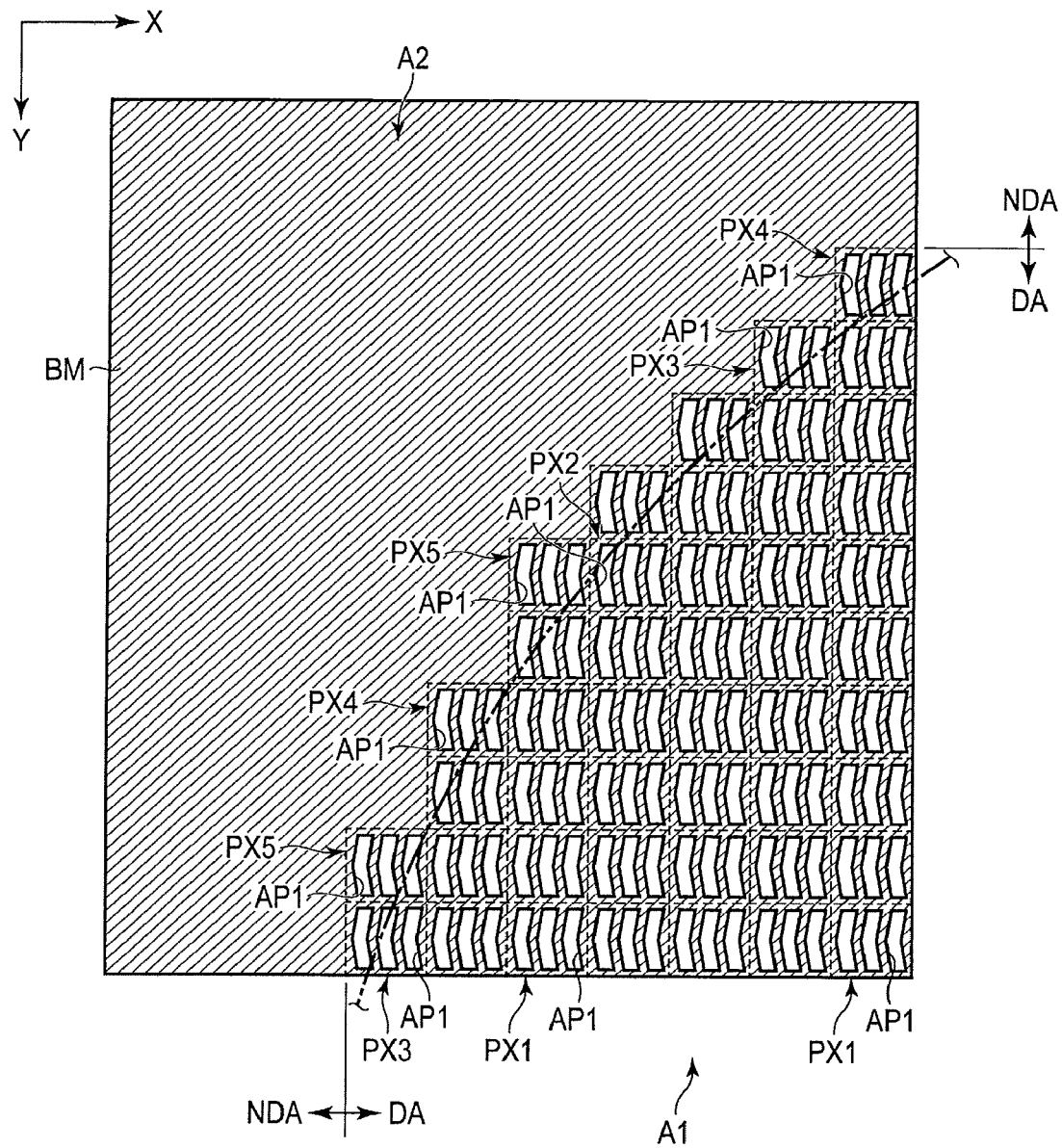
FIG. 23 is a plan view showing an area including a round part of a display area of a display panel of the display device of a fourth embodiment in which a light shielding layer and openings of pixels are depicted.

Now, a display device DSP of the fourth embodiment will be explained. In the first, second, and third embodiments, the aperture ratio of each pixel PX positioned over the boundary B is adjusted such that the roughness of the outline of the round parts R1 to R4 of the display area DA can be less recognized. In the present embodiment, however, a voltage value applied to the liquid crystal layer LC is adjusted. FIG. 23 is a plan view showing an area including a round part R1 of the display area DA in a display panel PNL of the display device DSP of the fourth embodiment, in which a light shielding layer BM and openings AP of pixels PX are depicted.

As shown in FIG. 23, unlike the above embodiments, not only the first pixel PX1 but also each of the second pixel PX2 to fifth pixel PX5 has a first opening AP1 in the present embodiment. The aperture ratio of the first pixel PX1 to fifth pixel PX5 is the same. Thus, in the present embodiment, voltage values of image signals (for example, video signals) applied to the pixel electrode PE in each pixel PX of the second pixel PX2 to fifth pixel PX5 are adjusted altogether. When image signals gradation of which is gradually changed are supplied to each pixel PX positioned over the boundary B, the outline of the round parts of the display area DA are blurred by electric drive.

Figure 24:
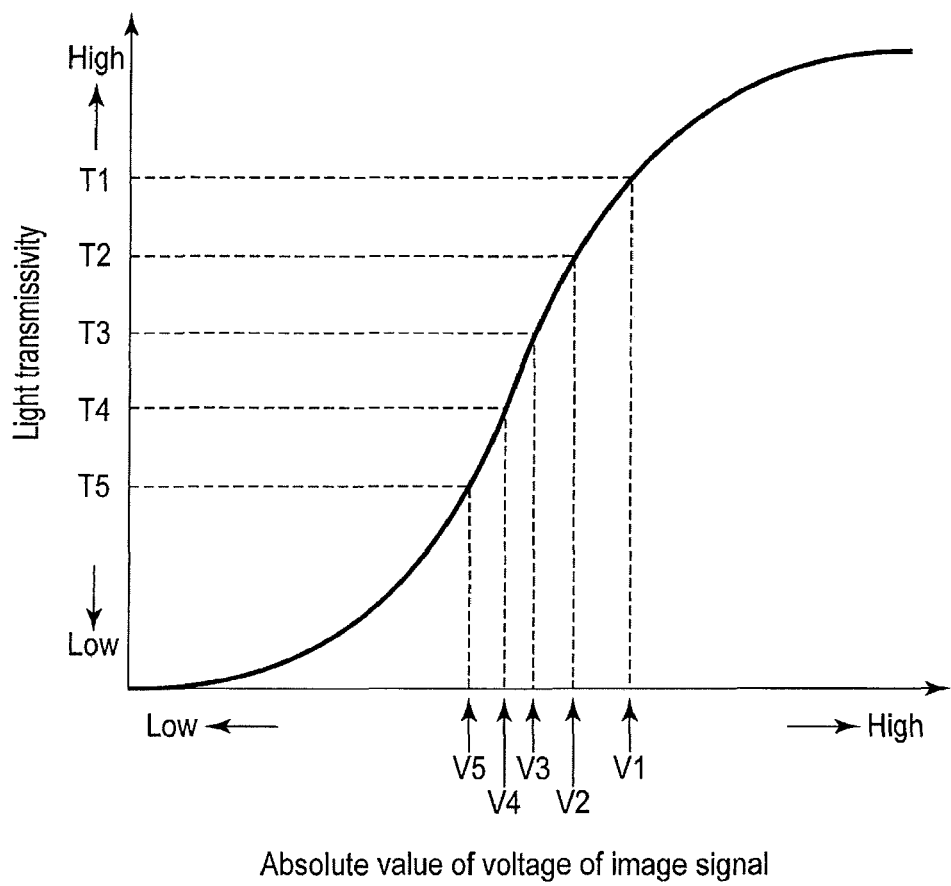
FIG. 24 is a graph showing changes of light transmissivity with respect to an absolute value of voltage value of image signal applied to pixel electrodes in the display device of the fourth embodiment.

FIG. 24 is a graph showing changes of light transmissivity with respect to an absolute value of voltage value of image signal applied to pixel electrodes PE in the display device DSP of the fourth embodiment.

As shown in FIG. 24, a case where an optional subpixel SP has an optional light transmissivity T1. In that case, if the optional subpixel SP is a subpixel SP of the first pixel PX1, an image signal of a voltage value V1 is applied to the pixel electrode PE of the first pixel PX1.

Similarly, if the optional subpixel SP is a subpixel SP of the second pixel PX2, an image signal of a voltage value V2 which is less than the voltage value V1 is applied to the pixel electrode PE of the second pixel PX2. If the optional subpixel SP is a subpixel SP of the third pixel PX3, an image signal of a voltage value V3 which is less than the voltage value V2 is applied to the pixel electrode PE of the third pixel PX3. If the optional subpixel SP is a subpixel SP of the fourth pixel PX4, an image signal of a voltage value V4 which is less than the voltage value V3 is applied to the pixel electrode PE of the fourth pixel PX4. If the optional subpixel SP is a subpixel SP of the fifth pixel PX5, an image signal of a voltage value V5 which is less than the voltage value V4 is applied to the pixel electrode PE of the fifth pixel PX5.

In other words, each pixel PX of the second pixel PX2 to fifth pixel PX5, a modulation factor of polarization is adjusted to be lower. The modulation factor of polarization in each subpixel of the second pixel PX2 is set lower than the modulation factor of polarization in each subpixel of the first pixel PX1.

Similarly, the modulation factor of polarization in each subpixel of the third pixel PX3 is set lower than the modulation factor of polarization in each subpixel of the second pixel PX2. The modulation factor of polarization in each subpixel of the fourth pixel PX4 is set lower than the modulation factor of polarization in each subpixel of the third pixel PX3. The modulation factor of polarization in each subpixel of the fifth pixel PX5 is set lower than the modulation factor of polarization in each subpixel of the fourth pixel PX4.

The above example is applicable to a normally black mode in which the display panel PNL displays black in an off state where no voltage is applied to the liquid crystal layer LC. However, the above method may be applied to a normally white mode in which the display panel PNL displays white in an off state where no voltage is applied to the liquid crystal layer LC.

In the normally white mode, in each pixel PX of the second pixel PX2 to fifth pixel PX5, a modulation factor of polarization is adjusted to be higher. The modulation factor of polarization in each subpixel of the second pixel PX2 is set higher than the modulation factor of polarization in each subpixel of the first pixel PX1. Similarly, the modulation factor of polarization in each subpixel of the third pixel PX3 is set higher than the modulation factor of polarization in each subpixel of the second pixel PX2. The modulation factor of polarization in each subpixel of the fourth pixel PX4 is set higher than the modulation factor of polarization in each subpixel of the third pixel PX3. The modulation factor of polarization in each subpixel of the fifth pixel PX5 is set higher than the modulation factor of polarization in each subpixel of the fourth pixel PX4.

Note that, if the display device DSP is a reflective liquid crystal display device, the light reflectivity of the second pixel PX2 to fifth pixel PX5 is adjusted.

With the above-structured display device DSP of the fourth embodiment, image signals gradation of which is gradually changed are supplied to each pixel PX positioned over the boundary B, and thus, the advantages obtained in the first to third embodiments can be achieved in the present embodiment.

As can be understood from the above, a display device DSP of good display quality can be achieved in the fourth embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

As described above, the common electrode CE may be positioned above the pixel electrode PE.

As shown in FIG. 25, the pixel electrode PE is formed as a flat plate-like shape without a slit and is disposed between a pair of signal lines S adjacent to each other. The common electrode CE overlaps the signal lines S and the pixel electrode PE. The common electrode CE includes a slit CSL immediately above the pixel electrode PE. In the example depicted, the common electrode CE includes two slits CSL bending similarly to the signal lines S in a position opposed to one pixel electrode PE. The two slits CSL are arranged in the first direction X at intervals and have substantially the same width in the first direction X. Note that the shape of the pixel electrode PE is not limited to the example depicted, and may be arbitrarily changed depending on the shape of the pixel PX or the like. Furthermore, the shape or the number of the slits CSL are not limited to the example depicted.

What is claimed is:

1. A liquid crystal display device comprising:
   a first area;
   a second area outside the first area;
   a liquid crystal layer positioned in the first area and a part of the second area;
   a light shielding layer formed as a lattice in the first area and the part of the second area; and
   a plurality of pixels each including a plurality of subpixels having different colors,
   wherein
   the pixels are arranged in a first direction and a second direction which cross each other,
   each of the subpixels includes an opening area,
   the opening area includes a first opening area and a second opening area in which a rotation direction of liquid crystal molecules is different from that of liquid crystal molecules in the first opening area,
   the pixels include a first pixel positioned in the first area and a second pixel positioned over a boundary of the first area and the second area,
   the first opening area of the second pixel is smaller than the first opening area of the first pixel when opening areas of subpixels of a same color are compared,
   the second opening area of the second pixel is smaller than the second opening area of the first pixel when the opening areas of the subpixels of the same color are compared,
   the light shielding layer includes a plurality of first light shielding layers,
   the first light shielding layers extend in the first direction and are arranged in the second direction at intervals in gaps among the opening areas,
   in distances between a pair of first light shielding layers adjacent to each other in the second direction, a distance crossing the second pixel is less than a distance passing the first pixel,
   in each of the first pixel and the second pixel, an imaginary line showing the boundary of the first opening area and the second opening area is a same straight line extending in the first direction,
   in each of the subpixels, the first opening area and the second opening area are arranged continuously in the second direction,
   in the first pixel, a first length of the first opening area in the second direction is same as a second length of the second opening area in the second direction, and
   in the second pixel, a first length of the first opening area in the second direction is same as a second length of the second opening area in the second direction.

2. The liquid crystal display device of claim 1, wherein
the opening area of each subpixel includes a plurality of domains, and
the domain of the second pixel is smaller than the domain of the first pixel when domains having directors of same rotation direction are compared in the comparison of the opening areas.

3. The liquid crystal display device of claim 1, wherein
the boundary of the first area and the second area includes a linear-shaped first boundary and a round-shaped second boundary connected to the first boundary, and
the second pixel is positioned over the second boundary.

4. The liquid crystal display device of claim 1, wherein
the pixels further include a third pixel positioned over the boundary of the first area and the second area,
a proportion that the third pixel is located in the second area is larger than a proportion that the second pixel is located in the second area, and
the opening area of the third pixel is smaller than the opening area of the second pixel when opening areas provided with the subpixels of same color and having liquid crystal molecules of the same rotation state are compared.

5. The liquid crystal display device of claim 1, wherein
the first opening area extends in a fourth direction which is different from the first direction and the second direction, and
the second opening area is arranged continuously from the first opening area in the second direction and extends in a fifth direction which is different from the first direction, second direction, and fourth direction.

6. The liquid crystal display device of claim 1, wherein
the first length of the second pixel is less than the first length of the first pixel, and
the second length of the second pixel is less than the second length of the first pixel.

7. The liquid crystal display device of claim 1, further comprising:
a display area in which the pixels are disposed; and
a non-display area which is the second area where the pixels are not disposed.

8. A liquid crystal display device comprising:
a first area;
a second area outside the first area;
a liquid crystal layer positioned in the first area and a part of the second area;
a light shielding layer formed as a lattice in the first area and the part of the second area; and
a plurality of pixels each including a plurality of subpixels having different colors and arranged in a first direction, the pixels arranged in the first direction and a second direction crossing the first direction,
wherein
in a pair of pixels adjacent to each other in the second direction, the subpixels of one pixel include a first opening area defined by the light shielding layer in the center part of the subpixels, respectively, and the subpixels of the other pixel include a second opening area defined by the light shielding layer which is different from the first opening area with respect to a rotation direction of liquid crystal molecules in the center part of the subpixels, respectively,
the pixels include a first pixel positioned in the first area and a second pixel positioned over a boundary of the first area and the second area,
the first opening area of the second pixel is smaller than the first opening area of the first pixel when opening areas of subpixels of a same color and a same rotation direction of liquid crystal molecules are compared,
the light shielding layer includes a plurality of first light shielding layers extending in the first direction and arranged in the second direction at intervals in gaps among the first or second opening areas, and
widths of two of the first light shielding layers, which define the first opening area of the first pixel, are smaller than widths of two of the first light shielding layers, which define the first opening area of the second pixel.

9. The liquid crystal display device of claim 8, wherein
the boundary includes a linear-shaped first boundary and a round-shaped second boundary connected to the first boundary, and
the second pixel is positioned over the second boundary.

10. The liquid crystal display device of claim 8, wherein
the pixels further include a third pixel positioned over the boundary of the first area and the second area and closer to the second area than is the second pixel, and
the first opening area of the third pixel is smaller than the first opening area of the second pixel when opening areas provided with the subpixels of the same color are compared.

11. The liquid crystal display device of claim 8, wherein
in the first pixel and the second pixel arranged in the first direction, a position of the center of the first opening area of the first pixel in the second direction and a position of the center of the first opening area of the second pixel in the second direction are aligned in the first direction.

12. The liquid crystal display device of claim 8, wherein
the first opening area extends in a fourth direction which is different from the first direction and the second direction, and
the second opening area extends in a fifth direction which is different from the first direction, second direction, and fourth direction.

13. The liquid crystal display device of claim 8, wherein
in each of the pixels, the opening areas have a same length in the second direction, and
a length of the second pixel is less than a length of the first pixel.

14. The liquid crystal display device of claim 8, further comprising:
a plurality of first light shielding layers extending in the first direction and arranged in the second direction at intervals in gaps among the opening areas,
wherein
in distances between a pair of first light shielding layers adjacent to each other in the second direction, a distance crossing the second pixel which is less than a distance passing the first pixel.

15. The liquid crystal display device of claim 8, further comprising:
a display area in which the pixels are disposed; and
a non-display area which is the second area where the pixels are not disposed.

* * * * *